(12) United States Patent
Geurtsen et al.

(10) Patent No.: US 12,473,389 B2
(45) Date of Patent: Nov. 18, 2025

(54) BIO-BASED MONOMERS AND POLYMERS MADE THEREFROM

(71) Applicant: Columbia Insurance Company, Omaha, NE (US)

(72) Inventors: Richard Geurtsen, Robbinsville, NJ (US); Yong Yang, Hillsborough, NJ (US); Gary Dandreaux, River Edge, NJ (US); Cristian Grigoras, Suffern, NY (US)

(73) Assignee: Columbia Insurance Company, Omaha, NE (US)

( * ) Notice: Subject to any disclaimer, the term of this patent is extended or adjusted under 35 U.S.C. 154(b) by 456 days.

(21) Appl. No.: 18/016,960

(22) PCT Filed: Aug. 10, 2021

(86) PCT No.: PCT/US2021/045314
§ 371 (c)(1),
(2) Date: Jan. 19, 2023

(87) PCT Pub. No.: WO2022/035801
PCT Pub. Date: Feb. 17, 2022

(65) Prior Publication Data
US 2023/0279168 A1 Sep. 7, 2023

Related U.S. Application Data

(60) Provisional application No. 63/131,469, filed on Dec. 29, 2020, provisional application No. 63/074,189, (Continued)

(51) Int. Cl.
*C08F 220/14* (2006.01)
*C09D 133/14* (2006.01)

(52) U.S. Cl.
CPC .......... *C08F 220/14* (2013.01); *C09D 133/14* (2013.01)

(58) Field of Classification Search
CPC ........ C08F 220/14; C08F 2/30; C09D 133/14; C07D 303/16; C07C 69/54
See application file for complete search history.

(56) References Cited

U.S. PATENT DOCUMENTS 3,748,133 A 7/1973 Noonan et al.
2002/0009595 A1\* 1/2002 Hong .................. C08F 220/301
525/107

(Continued)

FOREIGN PATENT DOCUMENTS

WO 2012082141 A1 6/2012

OTHER PUBLICATIONS

Strehmel et al, A green step to new monomers and their polymerization, ChemistrySelect 2020, 5, 12109-12114 (Year: 2020).*

(Continued)

*Primary Examiner* — Alicia Bland
(74) *Attorney, Agent, or Firm* — The H.T. Than Law Group

(57) ABSTRACT

Disclosed herein is a frambinone methacrylate (FMA) or raspberry ketone methacrylate (RKMA) monomer having the following structure:

(Continued)

and a zingerone methacrylate (ZMA) having the following structure

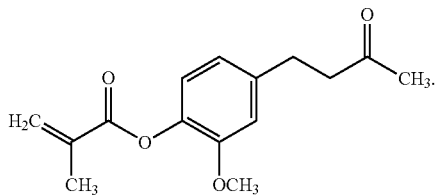

Also disclosed are homopolymers and co-polymers utilizing same monomer. Also disclosed is a class of methacrylate monomers comprising a bio-based moiety and a reactive ketone moiety. Also disclosed are paint compositions made with a copolymer including FMA and/or ZMA.

15 Claims, 22 Drawing Sheets

Related U.S. Application Data filed on Sep. 3, 2020, provisional application No. 63/063,594, filed on Aug. 10, 2020.

(56) References Cited

U.S. PATENT DOCUMENTS

| | | |
|---|---|---|
| 2014/0275435 A1 | 9/2014 | Holmberg et al. |
| 2018/0201703 A1 | 7/2018 | Kessler et al. |
| 2019/0010268 A1 | 1/2019 | Zhang et al. |
| 2021/0214297 A1 | 7/2021 | Bleith et al. |

OTHER PUBLICATIONS

Sanay et al, Photoinitiated polymerization of methacrylates comprising phenyl moieties, J Polym Sci, 2020, 58, 3196-3208 (Year: 2020).*
Godwin et al, Homopolymer of 4-propanoylphenyl methacrylate and its copolymers with glycidyl methacrylate: synthesis, characterization, reactivity ratios and application as adhesives, Reactive and Functional Polymers, 59, 2004, 197-209 (Year: 2004).*
Chinese Office Action issued in connection with the corresponding Chinese Patent Application No. 202180057189.6 on Dec. 17, 2024.
International Search Report and Written Opinion issued in connection with the corresponding International Application No. PCT/US2021/045314 on Nov. 24, 2021.
Tale, Nishant V., "Synthesis of Diacetone Acrylamide Monomer and Copolymers". Iranian Polymer Journal. vol. 19, No. 10, Mar. 22, 2010, pp. 801-810.
Rupavani et al. "Synthesis, Characterization and End Use Evaluation of 2-Allyl-3(5)-Pentadecyl Phenol and Their Acrylic/Methacrylic Esters". Eur. Polym. J. vol. 29, No. 6, pp. 863-869. 1993, Great Britain.
Roby et al. "Enzymatic production of bioactive docosahexaenoic acid phenolic ester". Food Chemistry 171, 2015. Pages 397-404.
Batra et al. "Acetylation of Phenols Using Acetic Acid". Forest Research Insitute. Jan. 24, 1949. pp. 349-351.
Gogoi et al. "Esterication of Carboxylic Acids By Acid Activated Kaolinite Clay". Indian Journal of Chemical Technology, vol. 15. Jan. 2008. pp. 75-78.
Al-Odayni et al. "New Monomer Based on Eugenol Methacrylate, Synthesis, Polymerization and Copolymerization with Methyl Methacrylate—Characterization and Thermal Properties". Polymers, 2020, 12, 160. pp. 1-28.
Lochab et al. "Naturally occurring phenolic sources: monomers and polymers". RSC Advocates, 2014, 4, 21712-21752. Jan. 8, 2014.
"Making Esters". https://www.chemguide.co.uk/organicprops/esters/preparation.html#:~:text=Phenols%20react%20with%20carboxylic%20acids,is%20unusable%20for%20preparation%20purposes.&text=Esters%20are%20produced%20when%20carboxylic,is%20usually%20concentrated%20sulphuric%20acid.
Athawale et al. "Lipase-catalyzed synthesis of geranyl methacrylate by transesterification: study of reaction parameters". Tetrahedron Letters, vol. 43, Issue 27. Jul. 1, 2002.

* cited by examiner

13C-APT NMR of Zingerone Methacrylate
(CH and CH3 are negative, and H2 and quaternary carbons are positive)

BIO-BASED MONOMERS AND POLYMERS MADE THEREFROM

FIELD OF THE INVENTION

The present invention relates to a novel class of bio-based monomers and homopolymers and to novel copolymers made from the new bio-based monomers. The present invention is also related to a new class of cross-linkable bio-based monomers that when one or more of the bio-based monomers are polymerized with other monomer(s), a film-forming polymer is produced which can be used in architectural compositions. The film-forming polymer crosslinks with a cross-linking agent in the liquid phase into a solid film when the architectural composition is applied to a substrate and the liquid phase evaporates.

BACKGROUND OF THE INVENTION

Bio-based and/or renewable compounds such as vanillin and vanillin alcohol, originally extracted from vanilla plantifolia beans and more recently from lignin, have been utilized in the cosmetic and fragrant industries and have been used to flavor foods and drinks. Vanillin and vanillin alcohol have been synthesized into monomers with hydroxy and aldehyde reaction sites. These monomers can be homopolymerized or copolymerized, as discussed in U.S. published patent application no. US2018/0201703 to Kessler et al (methacrylated vanillin (MV) and methacrylated vanillyl alcohol (MVA)) and in U.S. published patent application no. US 2014/0275435 to Holmberg et al., which are incorporated by reference herein in their entireties.

To form a stronger solid paint film from aqueous architectural compositions, a cross-linkable monomer, such as diacetone acrylamide (DAAM), is copolymerized with other monomers, such as acrylic, vinyl, styrene and/or urethane monomers, to form latex resin binders. After the architectural compositions are applied to a substrate and the aqueous phase evaporates, the DAAM moiety utilizing its ketone reaction site reacts in the aqueous phase with a crosslinking compound, such as a diamine or a dihydrazide compound, such as adipic acid dihydrazide (ADH), to self-crosslink the latex resins to form stronger paint films, e.g., films with higher resistance to scrubbing. Such cross-linking or self-cross-linking mechanism is discussed in commonly owned U.S. Pat. No. 9,040,617 B2, which is incorporated herein by reference in its entirety.

The utility of the MV monomer as a cross-linkable monomer in film-forming latex resins in architectural compositions is not yet known, due to the fact that the aldehyde reaction site is different from the ketone reaction site on the DAAM monomer. Hence, there remains a need for other cross-linkable monomers, preferably bio-based cross-linkable monomers, that function similar to or better than DAAM in architectural compositions.

SUMMARY OF THE INVENTION

Hence, the present invention relates to a novel class of bio-based monomers and homopolymers and to novel copolymers made from the new bio-based monomers and other monomers. The present invention is also related to a new class of cross-linkable bio-based monomers that when one or more of the bio-based monomers are co-polymerized with other monomer(s) forms a film-forming polymer used in architectural compositions. The film-forming polymer cross-links with a cross-linking agent in the liquid phase into a solid film when the architectural composition is applied to a substrate and the liquid phase evaporates.

The present invention is also directed to a class of methacrylate monomers comprising a bio-based moiety and a reactive ketone moiety.

The invention is also directed to a frambinone methacrylate or raspberry ketone methacrylate monomer having the following structure:

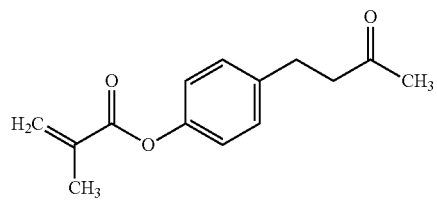 [SMILES: C=C(C)C(=O)Oc1ccc(CCC(C)=O)cc1]

The invention is also directed to a homopolymer made from said frambinone methacrylate monomer and to a copolymer made from monomers including the frambinone methacrylate monomer. The copolymer is capable of forming a film on a substrate when the aqueous or solvent base evaporates. A moiety of the copolymer formed from the frambinone methacrylate monomer is capable of crosslinking with a dihydrazide, diamine, or other suitable cross-linking agent in the aqueous phase, preferably when/as the aqueous phase evaporates.

The present invention is also directed to a zingerone methacrylate having the following structure:

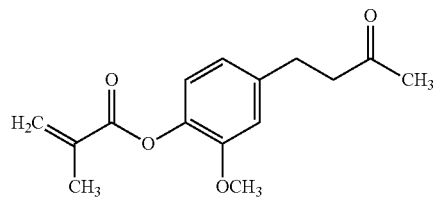 [SMILES: C=C(C)C(=O)Oc1ccc(CCC(C)=O)cc1OC]

The invention is also directed to a homopolymer made from said zingerone methacrylate monomer and to a copolymer made from monomers including the zingerone methacrylate monomer. The copolymer is capable of forming a film on a substrate when the aqueous or solvent base evaporates. A moiety of the copolymer formed from the zingerone methacrylate monomer is capable of crosslinking with a dihydrazide, diamine, or other suitable cross-linking agent in the aqueous phase, preferably when/as the aqueous phase evaporates.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
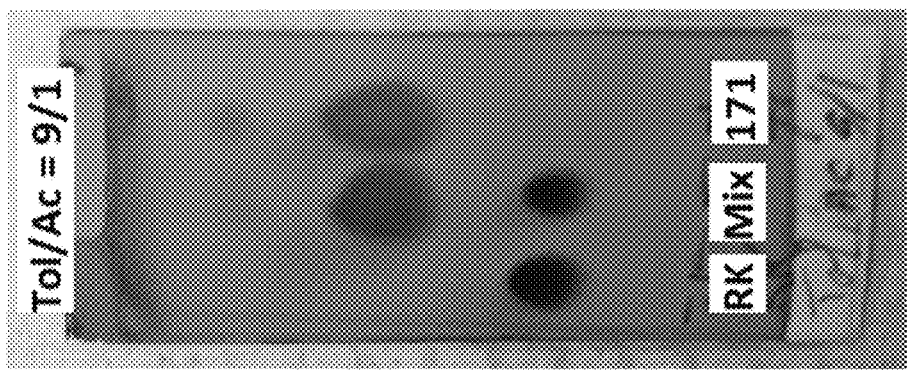
FIG. 1 is a photograph of a TLC test of samples of raspberry ketone and the inventive frambinone methacrylate (FMA) monomer, and a mixture of both.

Compounds, including but not limited to bio-based or renewable compounds, with a ketone reaction site

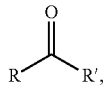

similar to DAAM were investigated and synthesized to produce monomers that could be polymerized into homopolymers, co-polymers and as cross-linkable moieties on co-polymers. Exemplary compounds with ketone reaction site include, but are not limited to, raspberry ketone and zingerone. Additional suitable compounds are discussed below.

In one embodiment, raspberry ketone is utilized as a starting material. Raspberry ketone is a naturally occurring compound and is the primary aromatic compound of red raspberry. Raspberry ketone can also be found in cranberries and blackberries and can be extracted from these fruits. Raspberry ketone can also be synthesized from non-bio sources. Raspberry ketone is also known as 4-(4-hydroxyphenyl)butan-2-one (IUPAC); p-hydroxybenzyl acetone; 4-(p-hydroxyphenyl)-2-butanone; frambinone; oxyphenylon; rheosmin and rasketone. Structurally, raspberry ketone comprises an aromatic phenyl ring connected at one end to a reactive hydroxy (—OH) reaction site and at the other end to a ketone reaction site albeit through spacers or intervening atoms, as shown below.

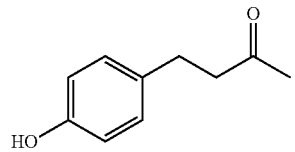

The present inventors believe that the hydroxy reaction site allows raspberry ketone to react with another compound or a monomer to be synthesized into a novel monomer. A preferred compound or monomer is methacrylic anhydride, which is a reactive monomer that can be used to prepare other monomers. Methacrylic anhydride has two acyl groups bonded to a single oxygen, and has the following structure,

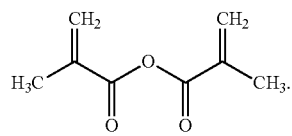

Example 1. Bi-Phasic Reaction Between Raspberry Ketone and Methacrylic

Anhydride.

To a solution of raspberry ketone, methacrylic anhydride and dimethylaminopyridine (DMAP) catalyst in dichloromethane (CH$_2$Cl$_2$) solvent was added an aqueous 16 wt. % solution of sodium hydroxide (NaOH). Dichloromethane is immiscible with water and is heavier than water (density 1.33 g/ml). The mixture was stirred for about ½ hour at room temperature (RT or about 77° F.). This procedure is much more efficient (near quantitative consumption of raspberry ketone starting material) than either the neat reaction of raspberry ketone with acetic anhydride in the presence of DMAP at elevated temperature, or the solvent-less biphasic reaction of raspberry ketone and acetic anhydride with a 16 wt. % aqueous solution of NaOH at RT. The organic phase was isolated and washed with respectively, deionized (DI) water, a 10 wt. % aqueous solution of hydrochloric acid (HCl), DI water, a 10 wt. % aqueous solution of sodium bicarbonate (NaHCO$_3$), and DI water. The organic phase was isolated and dried over magnesium sulfate (MgSO$_4$). The solution was then filtered, and evaporated to yield a new monomer, frambinone methacrylate (FMA), or raspberry ketone methacrylate (RKMA), as a clear, colorless liquid at RT. Upon aging, it is possible that the material will undergo a phase transition into a waxy, off-white solid.

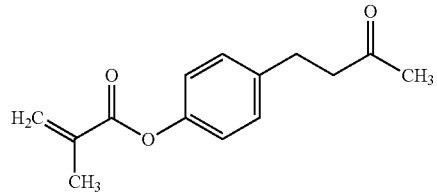 [SMILES: C=C(C)C(=O)Oc1ccc(CCC(C)=O)cc1]

As shown, the raspberry ketone's hydroxy reaction site was utilized to react and bond to an acyl moiety of the methacrylic anhydride. In this Example, 1.1 mole of methacrylic anhydride was used to react with 1 mole of raspberry ketone. Other than the resulting frambinone methacrylate monomer, the other compounds remaining in the mixture include the residual starting materials raspberry ketone and methacrylic anhydride.

The synthesis of frambinone methacrylate was confirmed through analytical tools, such as thin layer chromatography (TLC), $^1$H-NMR and $^{13}$C-NMR (nuclear magnetic resonance) spectroscopy focusing on hydrogen and carbon-13 respectively, Fourier Transform Infrared (FTIR) spectroscopy experiments, and gas chromatography-mass spectrometry (GC-MS), as described below.

Thin Layer Chromatograph (TLC). Samples of a mixture containing both frambinone methacrylate and raspberry ketone, only frambinone methacrylate and only raspberry ketone, were spotted or deposited proximate to a bottom end of a support substrate, e.g., aluminum or glass, covered by a stationary phase, which typically is silica gel. The TLC test measures the affinity of each composition in the samples to the stationary phase and to a mobile phase, which is a solvent or mixture of solvents. The support substrate with the samples spotted thereon is vertically held with the bottom end in the solvent, and the solvent moves up the support substrate via capillary action. The different compounds would move up the support substrate at different rate or distance depending on their polarities. Generally, the more polar compounds move up the support substrate slower than the less polar compounds.

As best shown in FIG. 1, a raspberry ketone spot is deposited on the left-hand side, and a frambinone methacrylate, labeled as "171," is deposited on the right-hand side. A spot that contains a mixture of both is deposited in between. The support substrate was turned vertically with the spots proximate the bottom and then the spots were eluted, i.e., to remove or move an adsorbed substance upward by washing with a solvent mixture, which comprises about 90% toluene and about 10% acetone. FIG. 1 shows that the raspberry ketone spot moved a first short distance upward and the frambinone methacrylate spot moved a second longer distance upward. Instructively, the spot of the mixture separated into two spots: one at the first distance of the raspberry ketone and another at the second distance of the frambinone methacrylate. The TLC test shows that frambinone methacrylate is different than or at least has a different polarity (is more hydrophobic) than the starting material raspberry ketone.

The retention factor ($R_f$), which is a ratio of the distance the frambinone methacrylate had moved up to the distance that the solvent mixture had moved up the support substrate, can be used to quantify TLC analyses. The $R_f$ for frambinone methacrylate in FIG. 1 is about 0.55 and the $R_f$ value of the Raspberry ketone is about 0.25.

Nuclear Magnetic Resonance (NMR) Spectroscopy. NMR spectroscopy measures selective absorption of high frequency radio waves by certain atomic nuclei that are subjected to an external magnetic field. A sample is placed in this magnetic field, and NMR signals are produced when nuclei aligned with the external magnetic field are excited into a state opposed to it by radio frequency (RF) waves, and the subsequent emission of absorbed RF energy is measured. The intramolecular magnetic field of an atom in a molecule changes the resonance frequency required for this magnetic field "flip", thereby providing information about molecular structure and functional groups. Two NMR experiments were conducted on the frambinone methacrylate. $^{13}$C-NMR is tuned to carbon-13. While the most common carbon isotope is carbon-12, which does not show up in NMR, there is a sufficient number of carbon-13 atoms present in organic molecules to reveal information about their structure. $^1$H-NMR is tuned to hydrogen nuclei (commonly referred to as protons). Frambinone methacrylate's structure with the carbons labeled from "a"-"l" and frambinone methacrylate's structure with the hydrogens labeled from "a"-"h," respectively, are shown below.

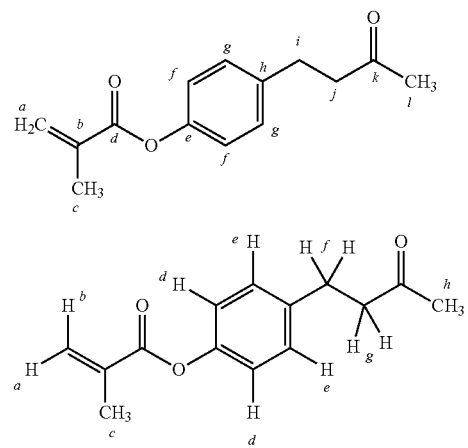

Figure 2:
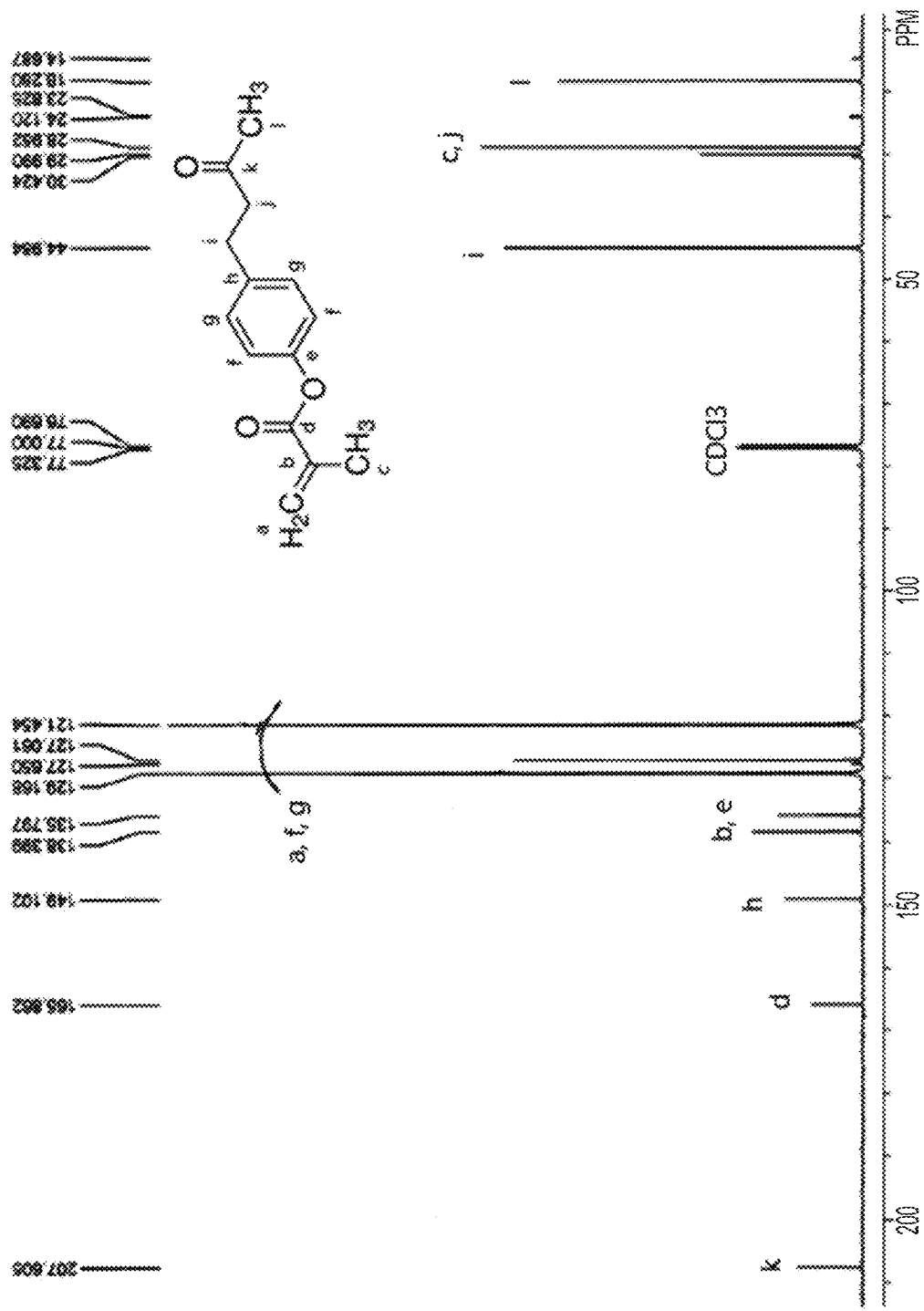
FIG. 2 shows a $^{13}$C-NMR spectrum of the inventive frambinone methacrylate monomer.
Figure 3:
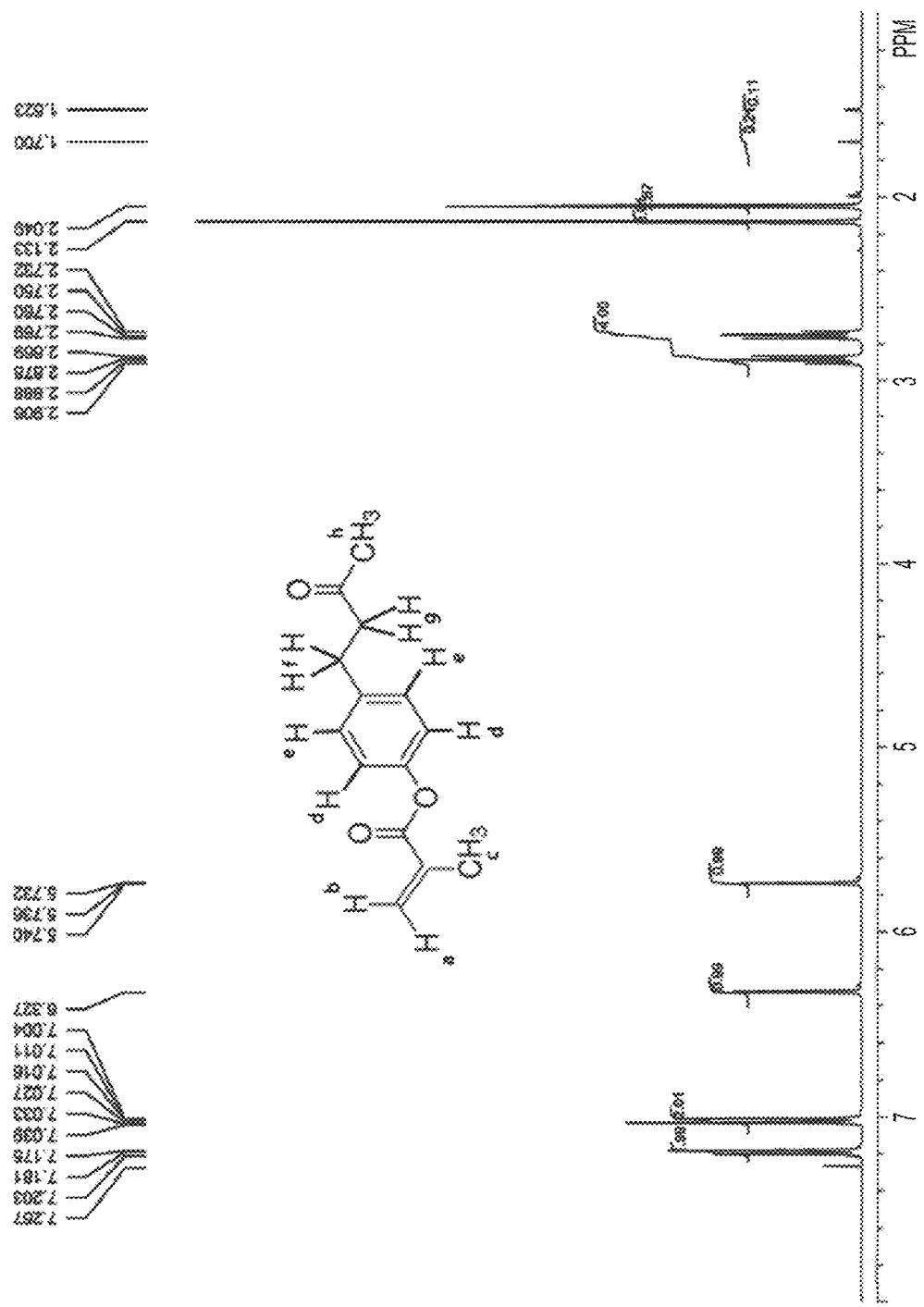
FIG. 3 shows a $^{1}$H-NMR spectrum of the inventive frambinone methacrylate monomer.

NMR analysis is usually conducted on a sample dissolved in a solvent. Because of the hydrophobic nature of the inventive monomer, deuterochloroform (CDCl$_3$) is used as the solvent in the experiments. In CDCl$_3$, hydrogen is replaced by its isotope deuterium to avoid signals from the hydrogen nuclei. The NMR instrument for FIG. 2 is rated at 100 MHz, which means that the instrument has a magnetic field in which hydrogen atoms resonate at 100 MHz. The NMR for FIG. 3 is rated at 400 MHz. Two peaks on a NMR graph that are 100 Hz apart from a 100 MHz instrument would be 300 Hz apart on a 300 MHz instrument and would be 400 Hz apart on a 400 MHz instrument, and so on. To normalize the horizontal axes on NMR graphs the frequency separation of the peaks is divided by the base resonance frequency to yield a ratio that when multiplied by 10$^6$ yields a value of ppm (parts per million).

FIG. 2 shows peaks for all of the carbon nuclei "a"-"l," as well as the characteristic triplet peak for deuterochloroform at 77 ppm. $^{13}$C NMR data (CDCl$_3$, 100 MHz): δ 207.6 (k), 165.9 (d), 149.1 (h), 138.4 (b), 135.8 (e), 129.2, 127.1, and 121.5 (a, f, and g), 77.3, 77.0, and 76.7 (CDCl$_3$), 45.0 (i), 30.0 and 29.0 (c and j), 18.3 (l).

FIG. 3 shows the peaks for all of the proton/hydrogen nuclei "a"-"h" with a small peak for the chloroform present in deuterochloroform at 7.3 ppm. In $^{13}$C-NMR, signal intensity is in the order of (large to small): CH$_3$>CH$_2$>CH>C-quaternary or carbonyl. In the proton spectrum, the integral is directly correlated to the amount of protons present. Splitting of the signal reveals information on how many neighboring protons there are, and on chemical structure. $^1$H NMR data (CDCl$_3$, 400 MHz): δ 7.27 (CHCl$_3$), 7.19 and 7.02 (2×multiplet, CH phenyl, d and e), 6.33 (multiplet, CH vinyl, b), 5.74 (multiplet, CH vinyl, a), 2.89 (triplet, CH$_2$, f/g, J$_{fg}$ 7.6 Hz), 2.75 (triplet, CH$_2$, f/g, J$_{fg}$ 7.6 Hz), 2.13 (singlet, CH$_3$, h), 2.05 (singlet, CH$_3$, c).

Fourier Transform Infrared (FTIR) Spectroscopy. FTIR spectroscopy measures the absorption of electromagnetic radiation in the infrared range (wavelengths from about 760 nm to about 103 μm). A broad band of electromagnetic radiation covering the IR range is exposed to a sample containing the test composition. An interferometer, such as a Michelson interferometer, receives the absorption signals from the sample and a computer utilizing the Fourier Transformation technique converts the data into information about the various segments or moieties from the test composition. Look-up tables containing absorption data for various moieties and functional groups, e.g., O—H, C—H, N—H, O=C=O, etc., at various frequencies ($cm^{-1}$) are used to identify the various moieties on the test composition. It is known that frequencies, also known as wavenumbers, and wavelengths are inverse of each other. An exemplary look-up table is available at sigmaaldrich.com/technical-documents/articles/biology/ir-spectrum-table.html.

Figure 4:
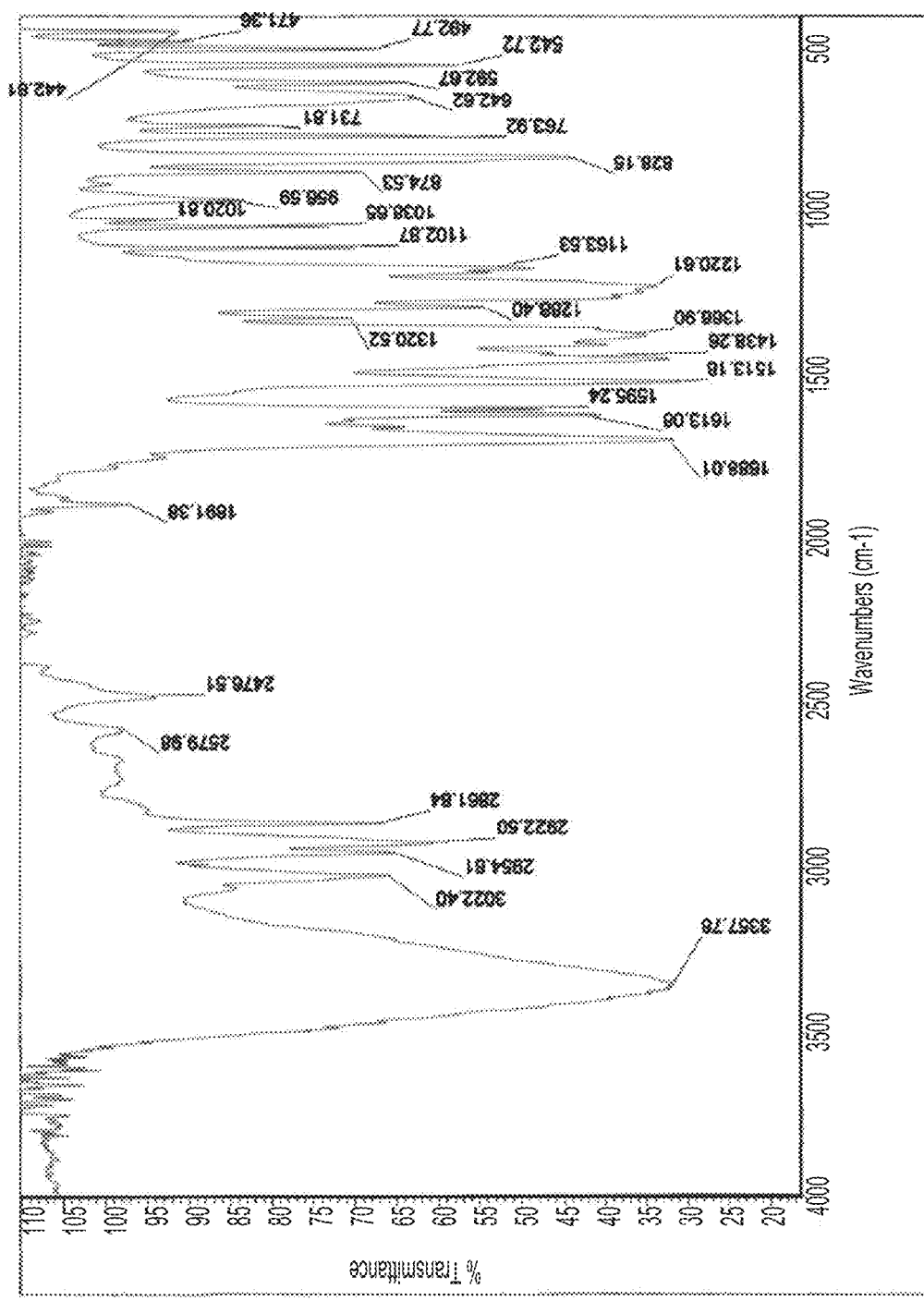
FIG. 4 shows a FTIR spectrum of raspberry ketone.
Figure 5:
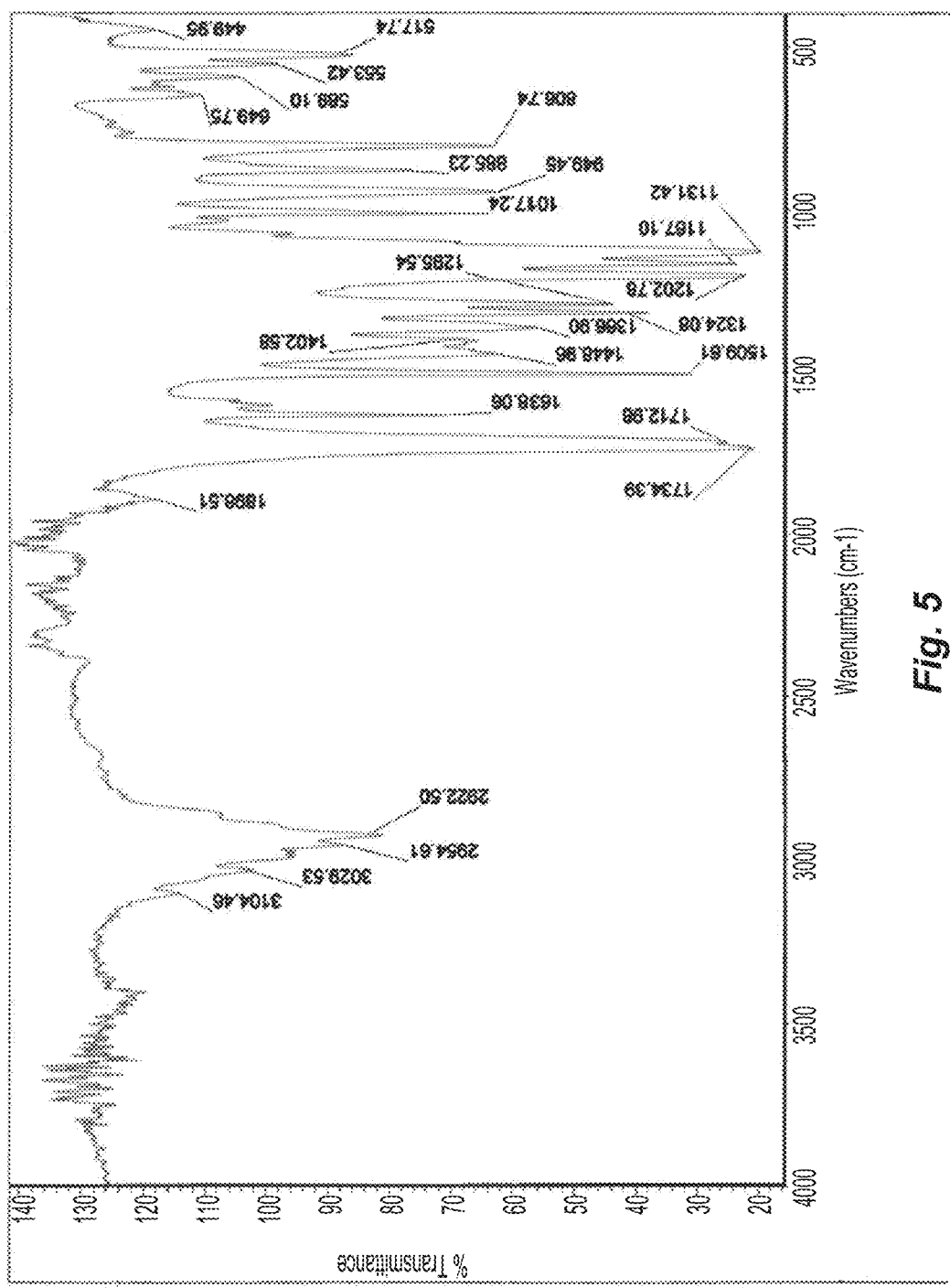
FIG. 5 shows a FTIR spectrum of the inventive frambinone methacrylate monomer.
Figure 6:
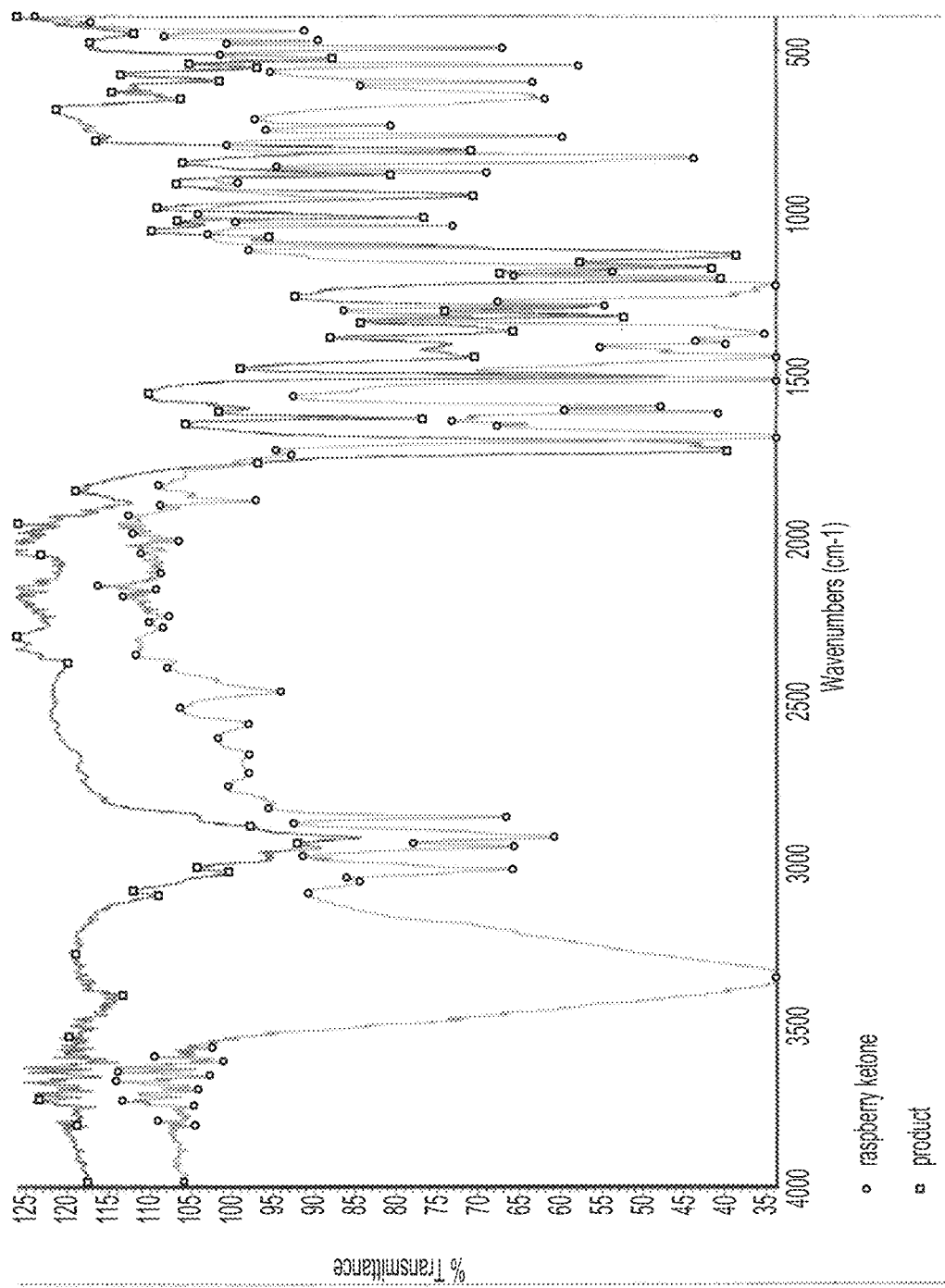
FIG. 6 shows the FTIR spectra of both FIGS. 4 and 5.

FIG. 4 is a FTIR spectrum of raspberry ketone showing the various moieties at their respective frequencies. Of notes are the dip at 3358 $cm^{-1}$, which represents the phenol-hydroxy segment, and the ketone segment at 1688 $cm^{-1}$. FIG. 5 is a FTIR spectrum of the inventive frambinone methacrylate and FIG. 6 is a superposition of both spectra from FIGS. 4 and 5 with the spectrum for frambinone methacrylate substantially on top of the spectrum for raspberry ketone. FIG. 6 shows the disappearance of the phenol-hydroxy moiety in the frambinone methacrylate monomer, which confirms that the hydroxy reaction site was used in the reaction. The ester ketone spike was shifted slightly to 1713 $cm^{-1}$ and the occurrence of the methacrylate carbonyl at 1734 $cm^{-1}$ and C=C vinyl at 1638 $cm^{-1}$ are indicative of the synthesis of a new composition. FTIR data (in $cm^{-1}$): 3105-2929 (broad, multiple peaks), 1899 (weak), 1734, 1713, 1638, 1510, 1449, 1403, 1367, 1324, 1296, 1203, 1167, 1131, 1017, 949, 885, 807, 650 (weak), 569, 553, 518, 450 (weak).

Gas Chromatography-Mass Spectrometry (GC-MS). The GC-MS technique is a combination of gas chromatography (GC) and mass spectrometry (MS). In the GC portion, a carrier gas, which is typically helium, nitrogen or hydrogen, containing a sample mixture to be analyzed, known as the mobile phase, passes through a length or column of glass or metal containing a microscopic layer of liquid or polymer deposited on an insert support, known as the stationary phase. The gaseous mobile phase interacts with the stationary phase and each constituent of the sample mixture will elute at different time, known as retention time. The constituents are ionized by a bombardment of electrons in the MS portion. The molecules of the constituents and fragments thereof are charged and are separated according to their mass to charge ratio (m/z) by subjecting them to an electric or magnetic field. Their mass to charge ratio is related to the path of the charged molecules to a detector. The relative signal intensity is plotted as a function of m/z. The combination of GC and MS increases the accuracy of the identification of the molecules to be analyzed, because if MS identifies a molecule that has a corresponding GC retention time then the identification of that molecule is more assured.

Figure 7A:
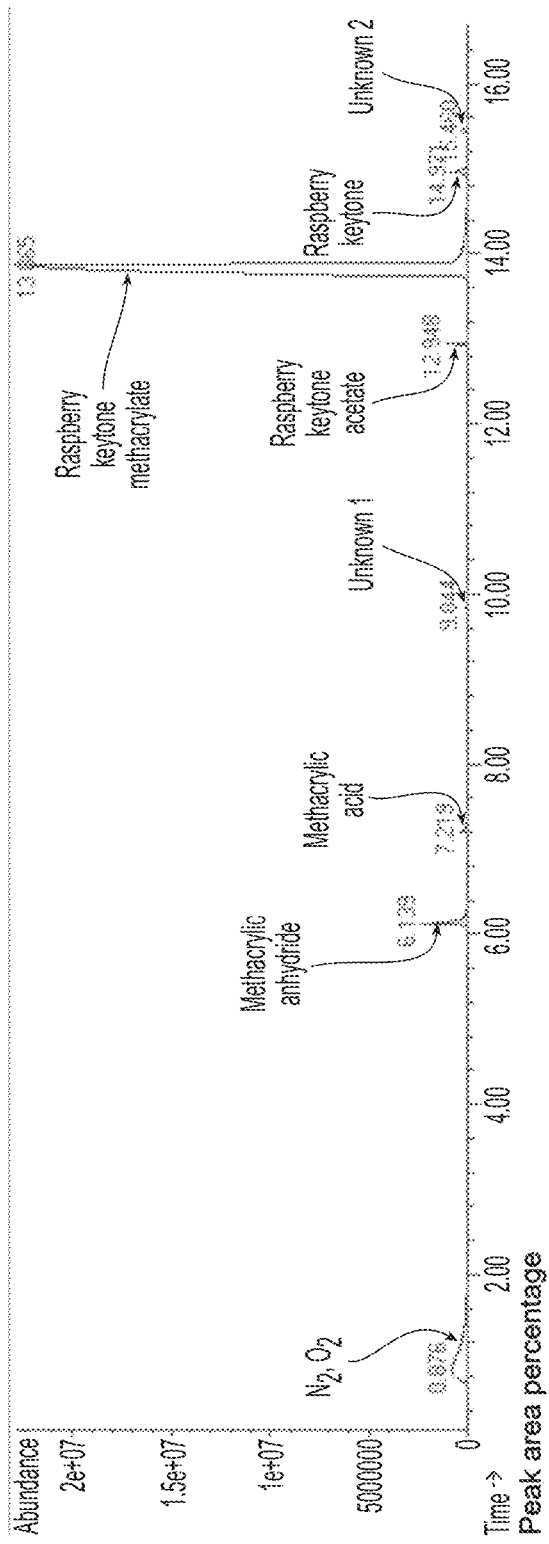
FIGS. 7(a)-(b) show the results of a GC-MS analysis of the crude frambinone methacrylate monomer product mixture.

FIG. 7(a) shows the retention times of the various constituents of the gas sample that contains a strong signal at 13.865 minutes. The percentage of total abundance represents the percentage of the area of one peak over the total areas under all the peaks. Other minor components, e.g., less than 3%, include the original reactants (methacrylic anhydride at 6.131 minutes and raspberry ketone at 14.965 minutes) and even smaller amounts, e.g., less than 1%, of raspberry ketone acetate at 12.942 minutes and methacrylic acid at 6.139 minutes. A peak at 0.876 minutes of a constituent is believed to oxygen and nitrogen, as discussed below, which are the main components of air. The present inventors believe that this peak was caused by air introduced into the test. The abundance of peak at 13.865 minutes represents about 94% of the total abundance of all the constituents of the samples, when the oxygen and nitrogen peak is discounted.

Figure 7B:
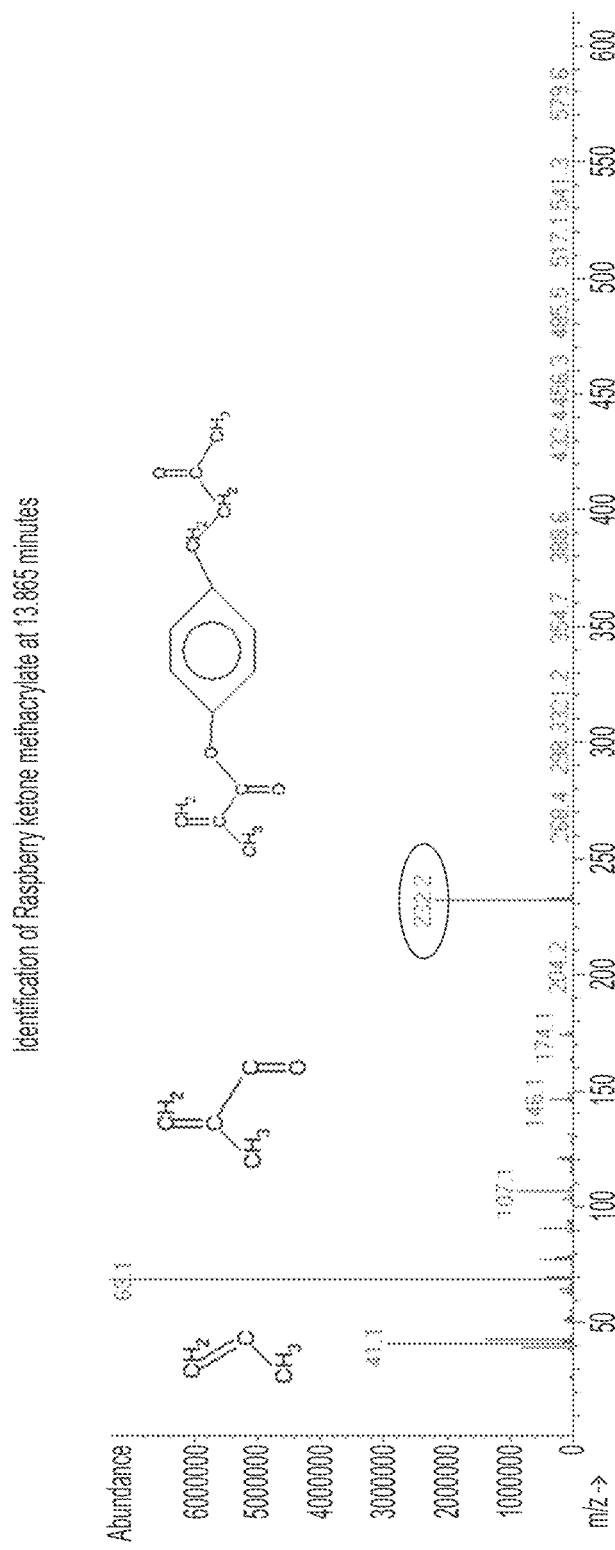
Figure 8A:
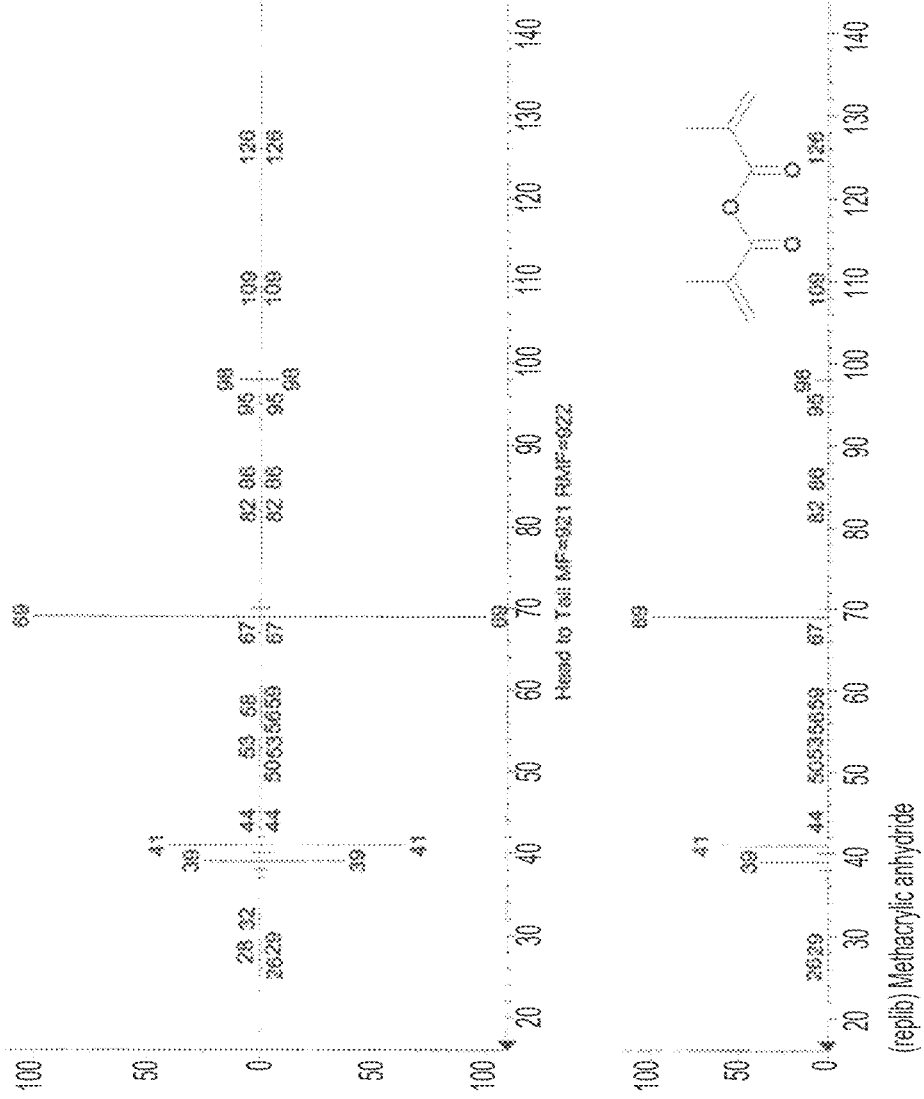
FIGS. 8(a)-(c) show the MS results on some of the impurities present in the crude product mixture of FIG. 7(a); these were identified as methacrylic anhydride, raspberry ketone and raspberry ketone acetate constituents, respectively.
Figure 8B:
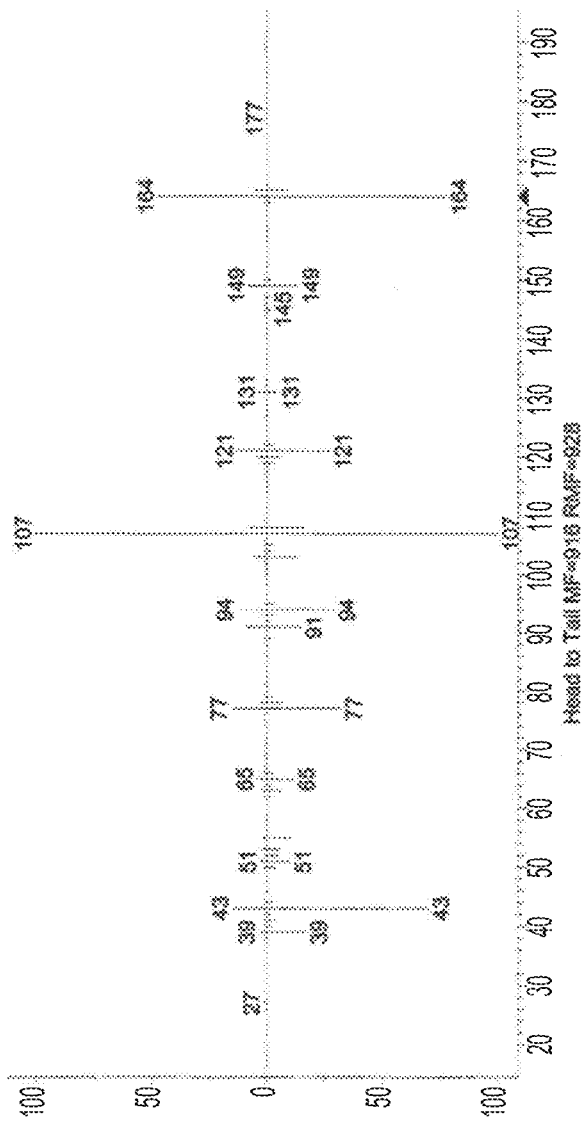
Figure 8B:
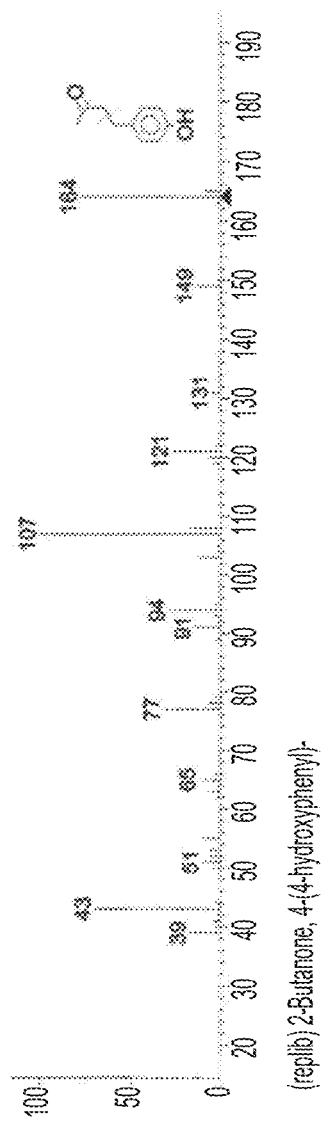
Figure 8C:
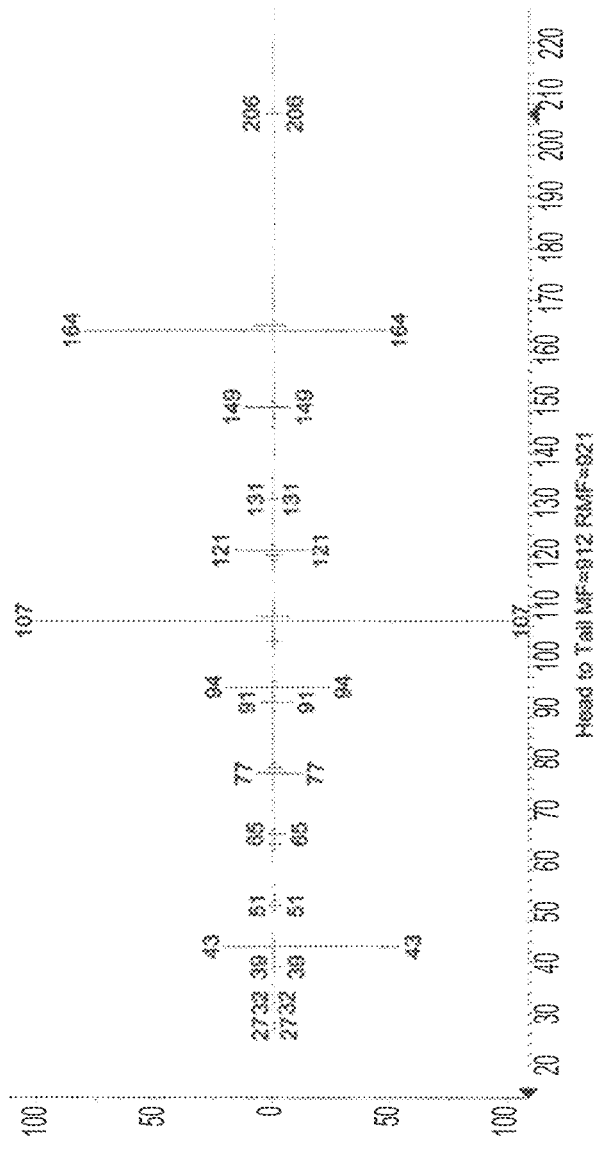
Figure 8C:
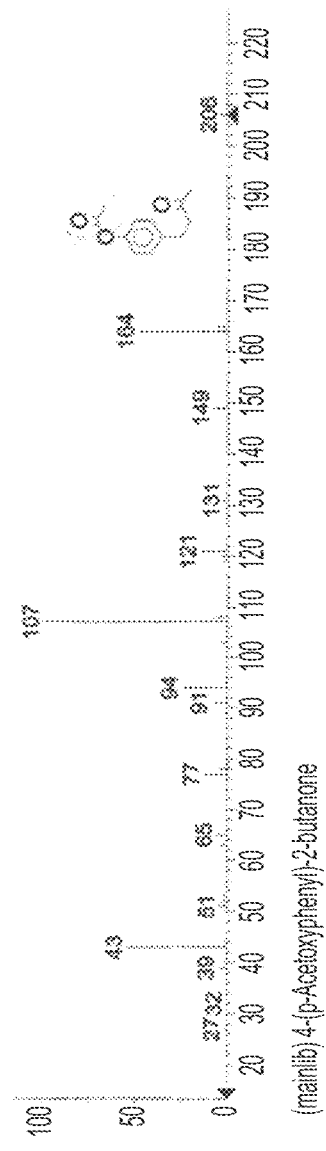

FIG. 7(b) shows the mass spectrum of the GC peak at 13.865 minutes; here, the molecular ion peak at 232.2 corresponds with the molecular weight of frambinone methacrylate, and the fragmentation pattern shows peaks at 69.1 and 41.1, which are indicative of the methacrylate portion of the molecule. The mass spectra for the GC peaks at 6.139, 14.971, and 12.948 minutes in FIG. 7(a) are shown in FIGS. 8(a)-(c) and found to be consistent with reference spectra for methacrylate anhydride, raspberry ketone and raspberry ketone acetate, respectively. The mass spectrum for methacrylic anhydride in FIG. 8(a) matches the standard mass spectrum for same as published in the PubChem.ncbi.nlm.nih.com website with peaks at 39, 41 and 69 on the m/z axis. The mass spectrum for raspberry ketone shown FIG. 8(b) matches the standard mass spectrum for that compound from the same source with peaks at 43, 77, 94, 107 and 164 on the m/z axis. The mass spectrum for raspberry ketone acetate in FIG. 8(c) is similar to the mass spectrum for raspberry ketone shown in FIG. 8(b) with the same peaks, since these two compounds are structurally similar, and has an additional small peak at 206, which is indicative for the molecular ion. The mass spectrum for nitrogen and oxygen from the same PubChem source has peaks at 28 and 32, respectively, and the mass spectrum for methacrylic acid has peaks at 39, 40.5 and 86 on the m/z axis. None of these compounds has a strong peak above 164 on the m/z axis.

Referring back to FIG. 7(b), the strong peaks at m/z at 41.1 and 69.1 are associated with predominantly the methacrylic acid portion of frambinone methacrylate, and with the methacrylic anhydride impurity or fragments thereof. The peaks at 43 and 107.1 are associated with predominantly the raspberry ketone portion of frambinone methacrylate, and with raspberry ketone and raspberry ketone acetate impurities. The peak at m/z=232.2 at 13.865 minutes represents the molecular ion of the novel frambinone methacrylate monomer.

The TLC test (FIG. 1), the NMR spectroscopy (FIGS. 2-3), the FTIR spectroscopy (FIGS. 4-6) and the GC-MS test (FIGS. 7-8 and subparts) confirm that a novel monomer, frambinone methacrylate, was synthesized.

Example 2. Homo-Polymerization of Frambinone Methacrylate

The novel frambinone methacrylate monomer was polymerized utilizing the solution polymerization technique. Frambinone methacrylate and a 1 wt. % initiator solution of azobisisobutyronitrile (AIBN) were admixed in tertiary butanol solvent. The mixture was sealed and stored at 65° C. for 48 hours. Thereafter, the solid that had formed was isolated, washed with isopropyl alcohol (IPA), and dried in a forced air oven at 65° C. The homopolymer was isolated as a white solid at RT, and ground to a white powder.

Figure 9:
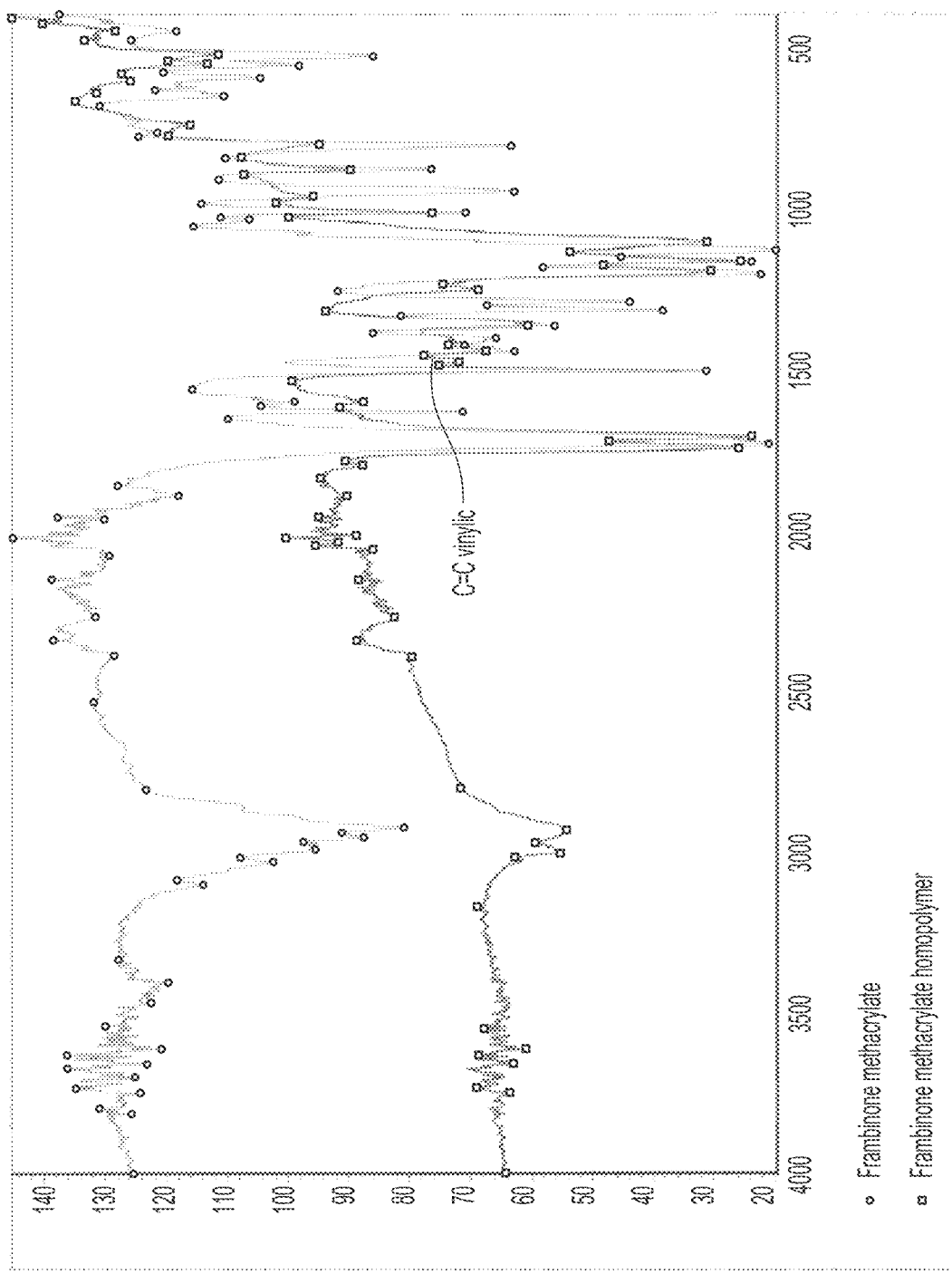
FIG. 9 shows the FTIR spectra of the inventive monomer frambinone methacrylate and of the frambinone methacrylate homopolymer.
Figure 10:
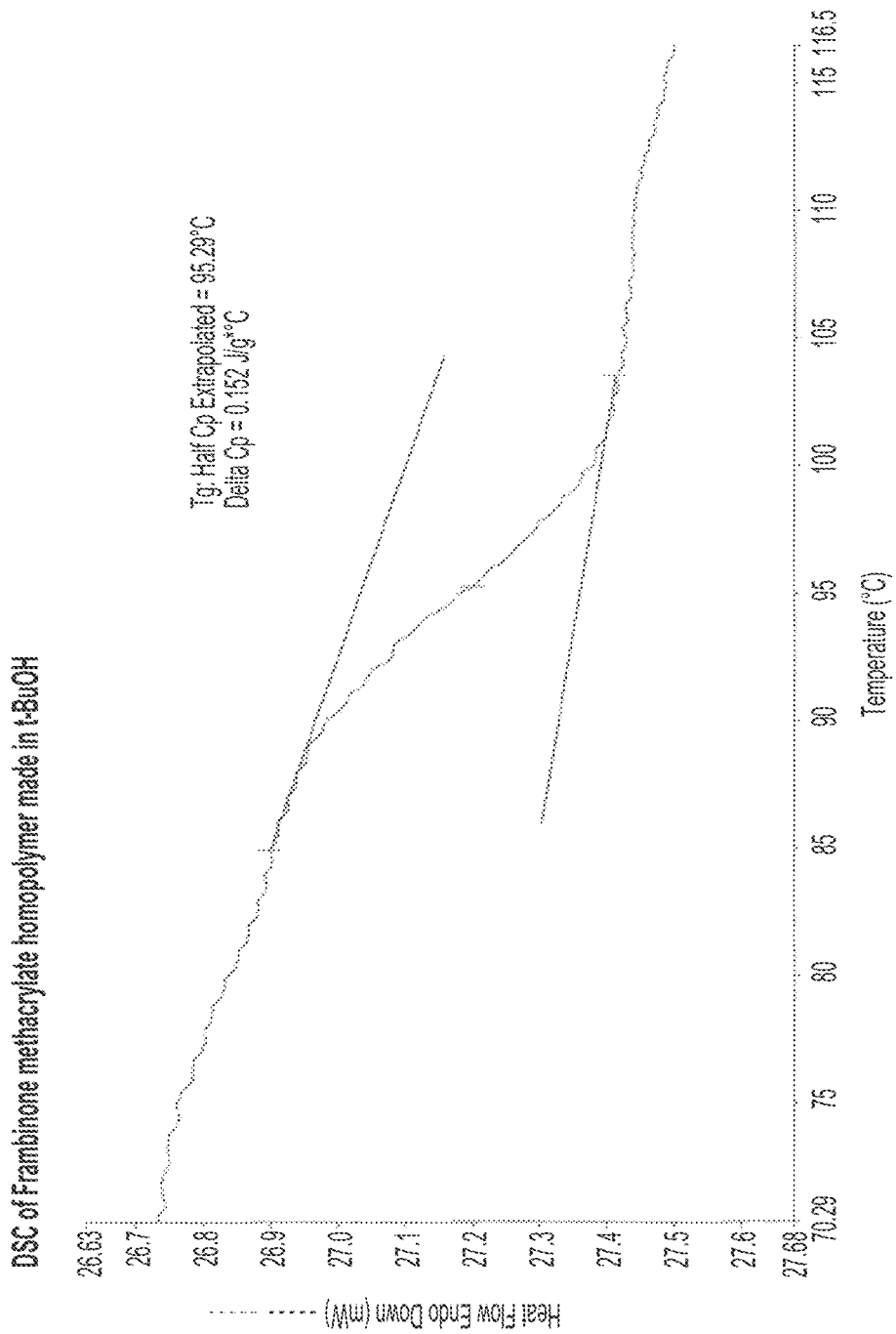
FIG. 10 is a DSC plot of the homopolymer of frambinone methacrylate showing its glass transition temperature (Tg).

FIG. 9 shows a FTIR graph of the frambinone methacrylate monomer substantially on top of a FTIR graph of the homopolymer of this monomer. The sharp dip at 1638 cm', indicating the C=C vinylic moiety in the frambinone methacrylate monomer, is not present in the spectrum of the homopolymer, which is expected in homopolymer formation. The Tg of the frambinone methacrylate homopolymer was measured using the experimental differential scanning calorimetry (DSC) technique, and found to be 95° C., as shown in FIG. 10.

Example 3. Copolymerization Including Frambinone Methacrylate

Frambinone methacrylate was copolymerized with methyl methacrylate (MMA), butyl methacrylate (BA) and methacrylic acid (MAA) utilizing the emulsion polymerization technique. Frambinone methacrylate was utilized without further purification, except for the removal of the dichloromethane ($CH_2Cl_2$) solvent. Into a 1-liter, four-neck round bottom flask equipped with a thermocouple, feed tube, nitrogen inlet and a reflux condenser, water, surfactant and a sodium bicarbonate buffer were charged. An aqueous emulsion of MMA, BA, MAA (1 wt. % based on total monomer solids or BOTMS), a wet adhesion monomer (1 wt. % BOTMS) and frambinone methacrylate (5 wt. % BOTMS) was prepared. About 5 wt. % of the monomer emulsion was fed into the round bottom flask and the polymerization was started by an addition of a sodium persulfate initiator at about 80° C. After 15 minutes of stirring, more monomer emulsion was fed to the mixture and after 30 minutes the feed rate was increased. After 3 hours, all of the monomer emulsion was added to the mixture. The mixture was held at about 80° C. for 30 minutes, then cooled to about 60° C. The mixture was chased by adding in a dropwise fashion over 15 minutes with an oxidizer solution of tertiary butyl hydroperoxide (tBHP) and a reducer solution of sodium salt of an organic sulfinic acid derivative. The mixture was then cooled to about 35° C. and neutralized with a 3.5 wt. % solution sodium hydroxide (NaOH). The mixture was further cooled, and biocide was added.

Figure 11:
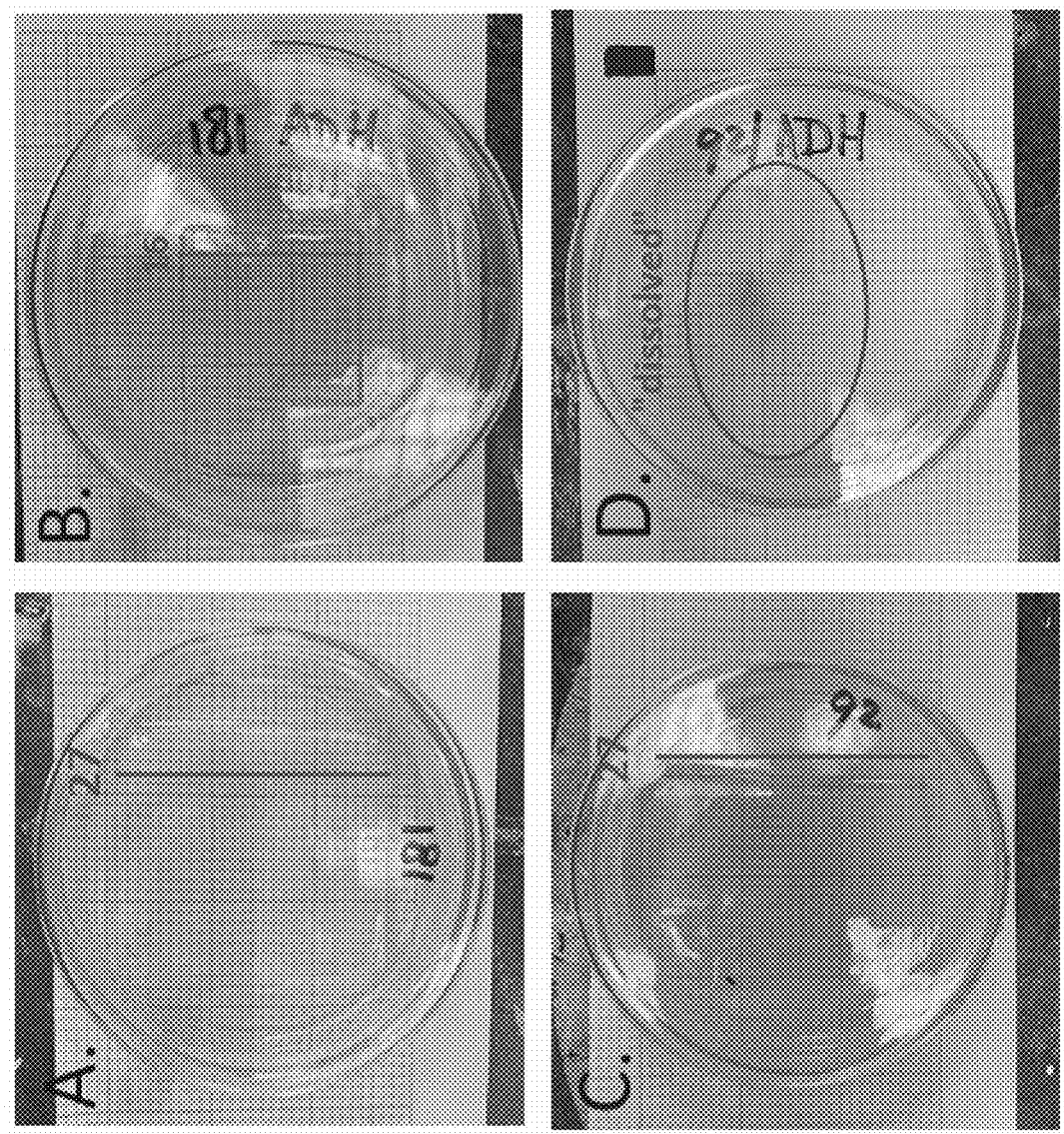
FIGS. 11(A)-(D) are photographs of dried film samples of an inventive FMA-containing copolymer, and a comparative copolymer, each with and without ADH, after a swell ratio test.

The inventive copolymer has the following properties:
pH=9.1%
solid=48.9%
Particle size=146.8 nm (volume average),
MFFT=3.4° C. per ISO 2115 (April 2001) for measuring minimum film forming temperature
Brookfield viscosity=110 cP The Swell-Ratio Test. The inventive copolymer from Example 3 was tested and compared to a comparative, similar copolymer without frambinone methacrylate. Both comparative sample and inventive Example 3 with and without ADH crosslinking agent in the aqueous phase were drawn on a clear substrate and allowed to evaporate and coalesce. As arranged in FIG. 11, sample A is Example 3 without ADH; sample B is Example 3 with ADH; sample C is a comparative copolymer without ADH, and sample D is the comparative copolymer with ADH.

In this test, resin films were drawn to a 20 mil (20 thousandth of 1-inch) thickness with a wet drawdown bar on glass sheets. The films were dried at constant humidity and constant temperature (RH of 70% and at RT). The dried films were released and cut into desired sample squares. The cut samples were developed in closed petri dishes in methyl ethyl ketone/toluene at 1:1 ratio solvent mixture for 2 hours. The size of the gel samples was measured on graph papers. 10 units are equaled to 25 mm (1 inch); 8 units are equaled to 20 mm. The swelling is isotropic, i.e., the sample length and width swelled to the same extent. A reduced swelling of a sample is an indication of cross-linking.

Squares of 8×8 units on each side were cut from the dried films. Inventive sample A without ADH and comparative samples C and D were not expected to cross-link, and after the immersion in the MEK/toluene solvent samples A and C had expanded or swelled to squares of 27×27 units. Sample D was partially dissolved. In contrast, inventive sample B with the crosslinking agent ADH had only expanded or swelled to a square of 16×16 units. The ratio of swelling is 162:272 or 256:729 or 1:2.85, which indicates that the inventive co-polymer self-cross-linked to each other via ADH forming a stronger film that was capable of resisting swelling by the solvents. The amount of cross-linking can be ascertained from the swell ratio by applying ASTM D2765 or ASTM F2214.

It is noted that Example 3 was neutralized with NaOH after polymerization as discussed above, but was still able to resist swelling indicating significant cross-linking, which is surprising, since it is known that ketone-hydrazide cross-linking is promoted by a pH change into the acidic region.

As shown by the above disclosures, a new monomer frambinone methacrylate (FMA) or raspberry ketone methacrylate (RKMA) was synthesized. A homopolymer of FMA or RKMA has an experimental Tg via DSC of about 95° C. FMA or RKMA when copolymerized with other monomers to form a latex copolymer resin capable of forming a paint/stain film that can self-crosslink with a hydrazine.

In another embodiment, zingerone is utilized as a starting material. Zingerone is a ketone derived from the ginger plant, and is generally produced from gingerols, a volatile oil, during the drying process. Zingerone is also known as vanillyl acetone, 4-(4-hydroxy-3-methoxyphenyl)-2-butanone, or 4-(4-hydroxy-3-methoxyphenyl) butan-2-one or 4-phenylbutan-2-one. Structurally, zingerone is similar to raspberry ketone, described above, except that it has a methoxy group attached to the phenyl ring, as shown below.

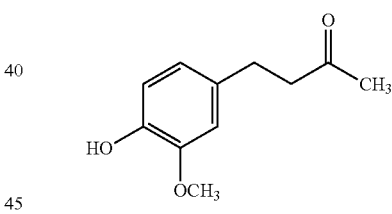

Similar to raspberry ketone, the hydroxy (OH) moiety in zingerone reacts with another compound or a monomer to be synthesized into another novel monomer. A preferred compound or monomer is methacrylic anhydride, which is a reactive monomer that can be used to prepare other monomers and is described above.

Example 4. Bi-Phasic Reaction Between Zingerone and Methacrylic Anhydride

A new zingerone methacrylate monomer was synthesized from zingerone and methacrylic anhydride from a bi-phasic reaction between zingerone and methacrylic anhydride, similar to Example 1 with zingerone replacing raspberry ketone, except that more solvent was used. Zingerone methacrylate has a higher tendency to precipitate due to the methoxy substituent on the phenyl ring, which increases the crystallinity of the monomer. To a solution of zingerone and methacrylic anhydride in dichloromethane ($CH_2Cl_2$) solvent was added an aqueous 10 wt. % solution of sodium hydroxide (NaOH). The mixture was stirred for about 1 hour at room temperature (RT or about 77° F.). The organic phase was isolated and washed with deionized (DI) water. The organic phase was isolated and concentrated to yield zingerone methacrylate as an off-white, crystalline solid. Zingerone methacrylate has the following structure:

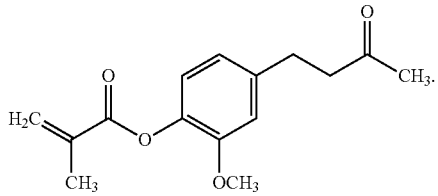 [SMILES: C=C(C)C(=O)Oc1ccc(CCC(C)=O)cc1OC]

As shown, the zingerone's hydroxy reaction site was utilized to react and bond to an acyl moiety of the methacrylic anhydride. In this Example, 1 mole of methacrylic anhydride was used to react with 1 mole of zingerone. Other than the resulting zingerone methacrylate monomer, the other compounds remaining in the mixture include traces of the residual starting materials, zingerone and methacrylic anhydride.

Figure 12:
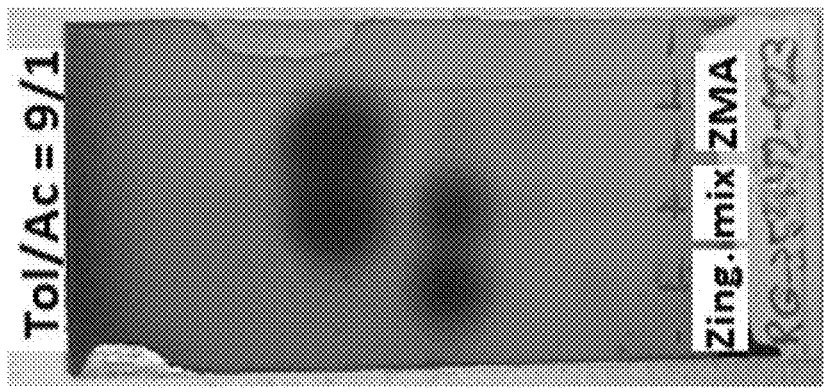
FIG. 12 is a photograph of a TLC test of samples of zingerone and the inventive zingerone methacrylate (ZMA) monomer, and a mixture of both.

Thin Layer Chromatograph (TLC). Samples of a mixture containing both zingerone methacrylate and zingerone, only zingerone methacrylate, and only zingerone, were spotted or deposited proximate to a bottom end of a support substrate, e.g., aluminum or glass, covered by a stationary phase, which typically is silica gel. As best shown in FIG. 12, a zingerone spot is deposited on the left-hand side, and a zingerone methacrylate, labeled as "ZMA," is deposited on the right-hand side. A spot that contains a mixture of both is deposited in between. The support substrate was turned vertically with the spots proximate the bottom and then the spots were eluted, i.e., to remove or move an adsorbed substance upward by washing with a solvent mixture, which comprises about 90% toluene and about 10% acetone. FIG. 12 shows that the zingerone spot moved a first short distance upward and the zingerone methacrylate spot moved a second longer distance upward. Instructively, the spot of the mixture separated into two spots: one at the first distance of the zingerone and another at the second distance of the zingerone methacrylate. The $R_f$ for zingerone methacrylate in FIG. 12 is about 0.58 and the $R_f$ value of the zingerone is about 0.36. The TLC test shows that zingerone methacrylate is different than or at least has a different polarity (is more hydrophobic) than the starting material zingerone.

Figure 13:
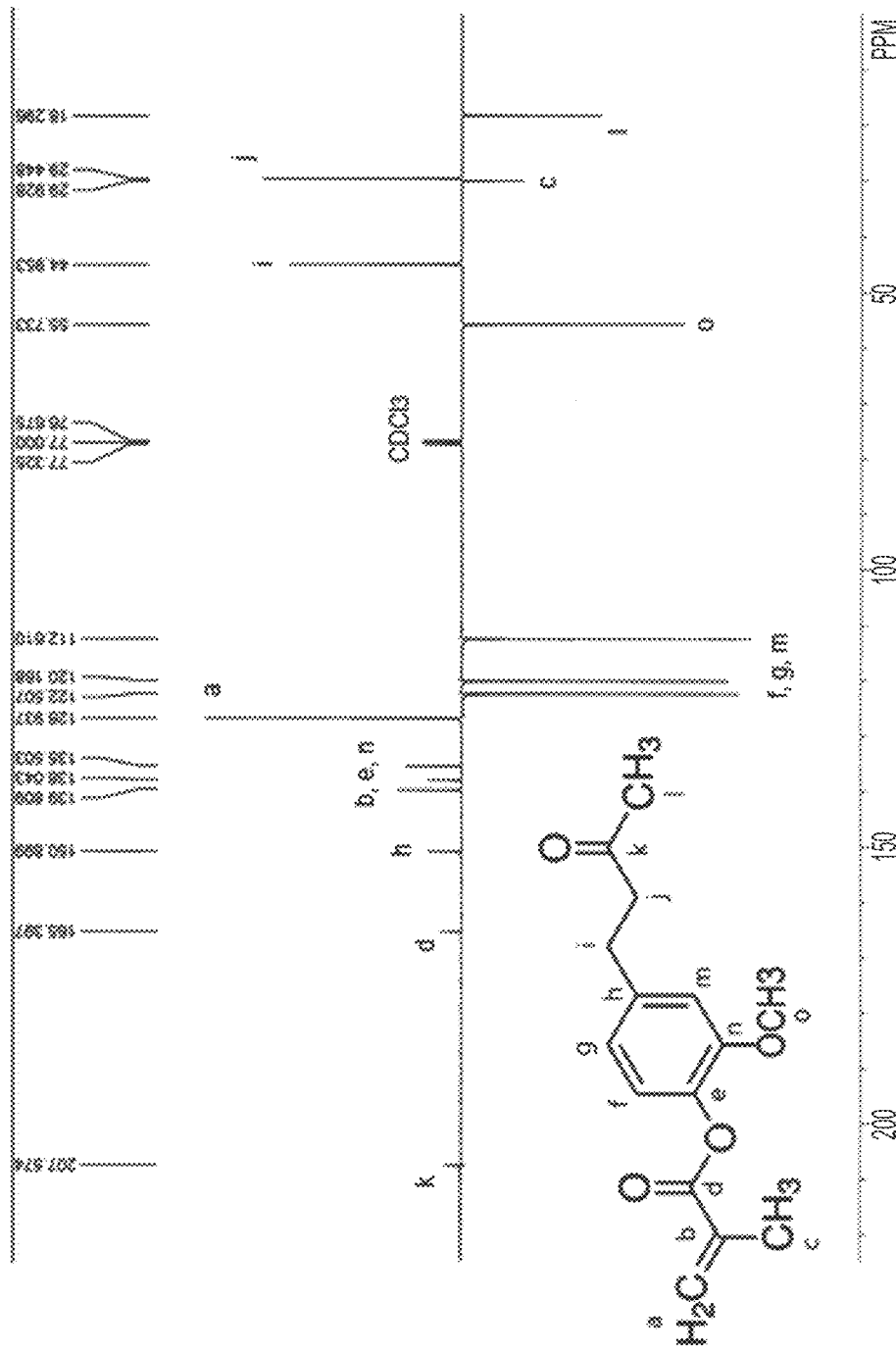
FIG. 13 shows a $^{13}$C-NMR spectrum of the inventive zingerone methacrylate monomer.
Figure 14:
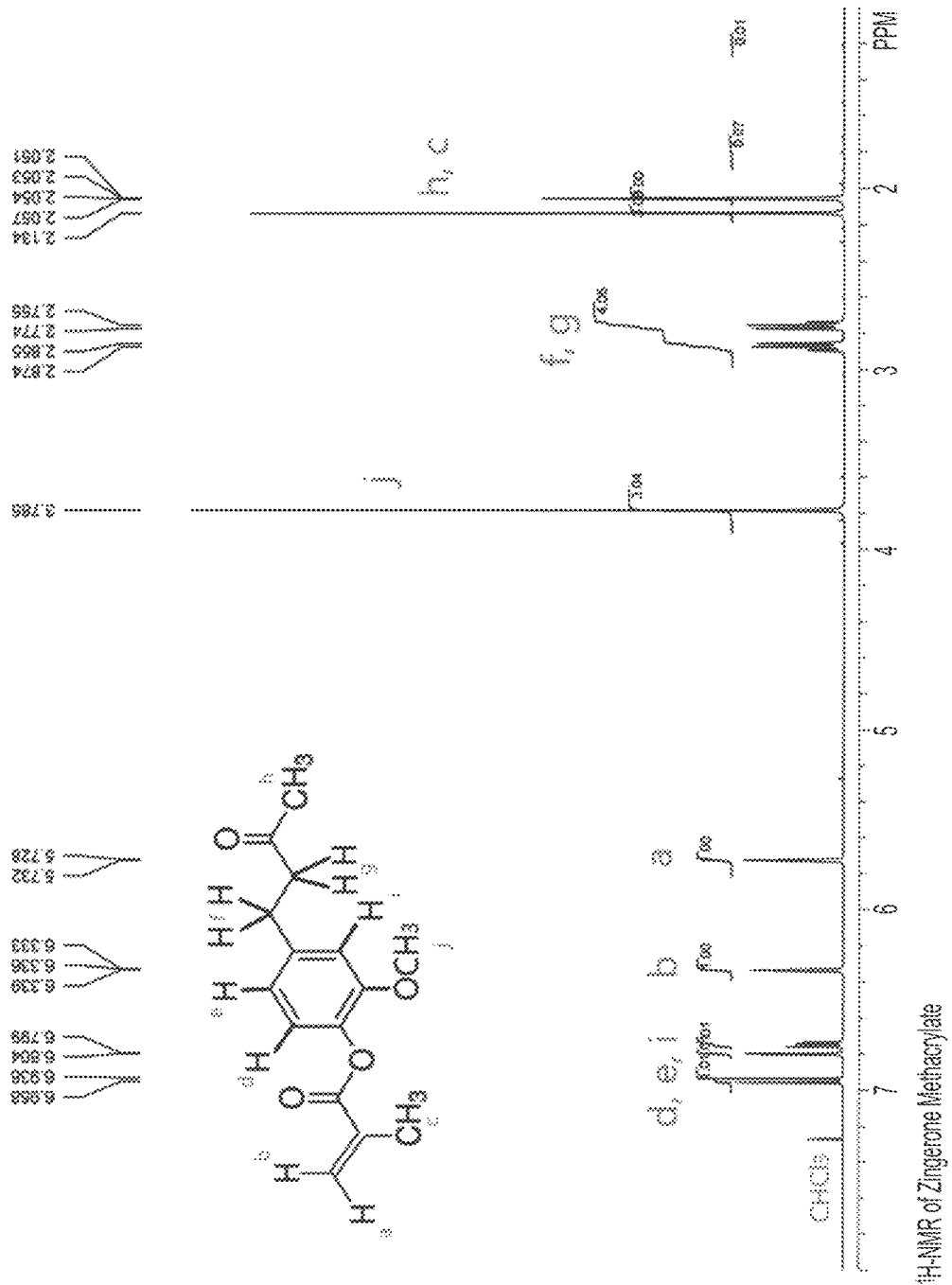
FIG. 14 shows a $^{1}$H-NMR spectrum of the inventive zingerone methacrylate monomer.

NMR spectroscopy analysis was also conducted for zingerone methacrylate. Zingerone methacrylate structure with the carbon labeled from "a" to "l", and with the hydrogen labeled from "a" to "h", respectively are shown below. FIG. 13 shows the $^{13}$C-NMR spectrum and FIG. 14 shows the $^1$H-NMR spectrum for zingerone methacrylate. The NMR instruments for FIGS. 13-14 are rated at 400 MHz.

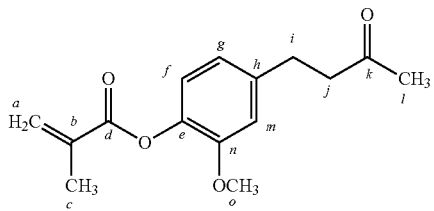

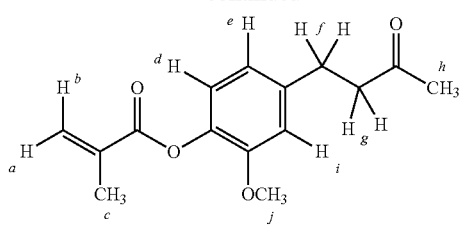

FIG. 13 shows the peaks for the carbon nuclei "a"-"l" as well as the characteristic triple peak for CDCl$_3$ at about 77 ppm. $^{13}$C-NMR data (CDCl$_3$ 400 MHz): δ 207.6 (k), 165.4 (d), 150.9 (h), 139.8, 138.0 and 135.5 (b, e and n), 126.9 (a), 122.5, 120.2 and 112.6 (f, g and m), 77.3, 77.0, and 76.7 (CDCl$_3$), 55.7 (o), 45.0 (i), 29.9 (c), 29.4 (j), and 18.3 (l).

FIG. 14 shows the peaks for the proton/hydrogen nuclei "a" to "h" with a small peak for the chloroform present in CDCl$_3$ at about 7.3 ppm. $^1$H NMR data (CDCl$_3$, 400 MHz): δ 7.27 (CHCl$_3$), 6.94 (doublet, CH phenyl, d, $J_{d,e}$ 8.0 Hz), 6.80 (doublet, CH phenyl, i, $J_{i,e}$ 2.0 Hz,), 6.75 (double doublet, CH phenyl, e, $J_{e,d}$ 8.0 Hz, $J_{e,i}$ 2.0 Hz), 6.34 (multiplet, CH vinyl, b), 5.73 (multiplet, CH vinyl, a), 3.79 (singlet, OCH$_3$, j), 2.87 (triplet, CH$_2$, f/g, $J_{f,g}$ ca. 7.2 Hz), 2.76 (triplet, CH$_2$, f/g, $J_{f,g}$ ca. 7.2 Hz), 2.13 (singlet, CH$_3$, h), 2.05 (multiplet, CH$_3$, c). NMR spectral data shows that the synthesis of zingerone methacrylate was successful.

Figure 15:
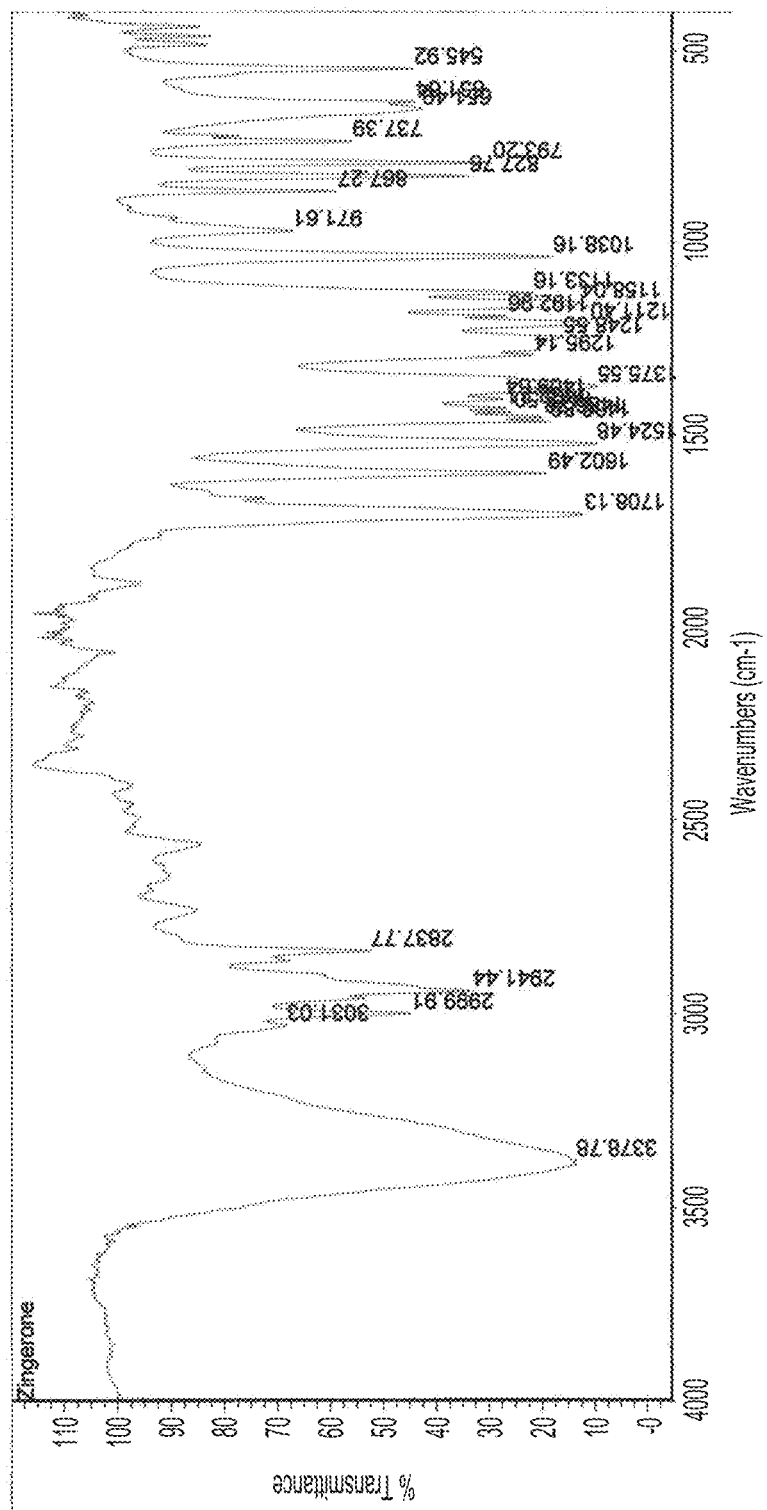
FIG. 15 shows a FTIR spectrum of zingerone.
Figure 16:
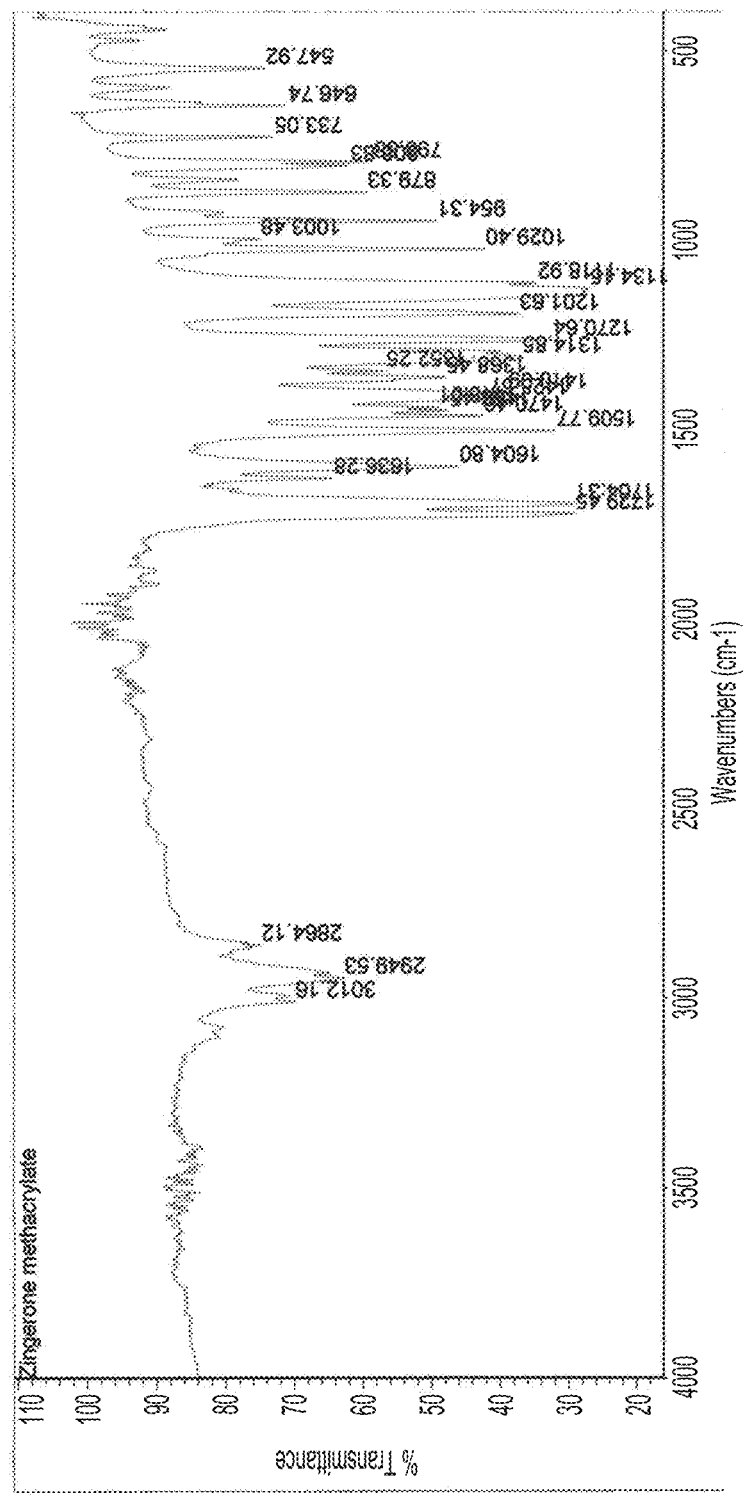
FIG. 16 shows a FTIR spectrum of the inventive zingerone methacrylate monomer.
Figure 17:
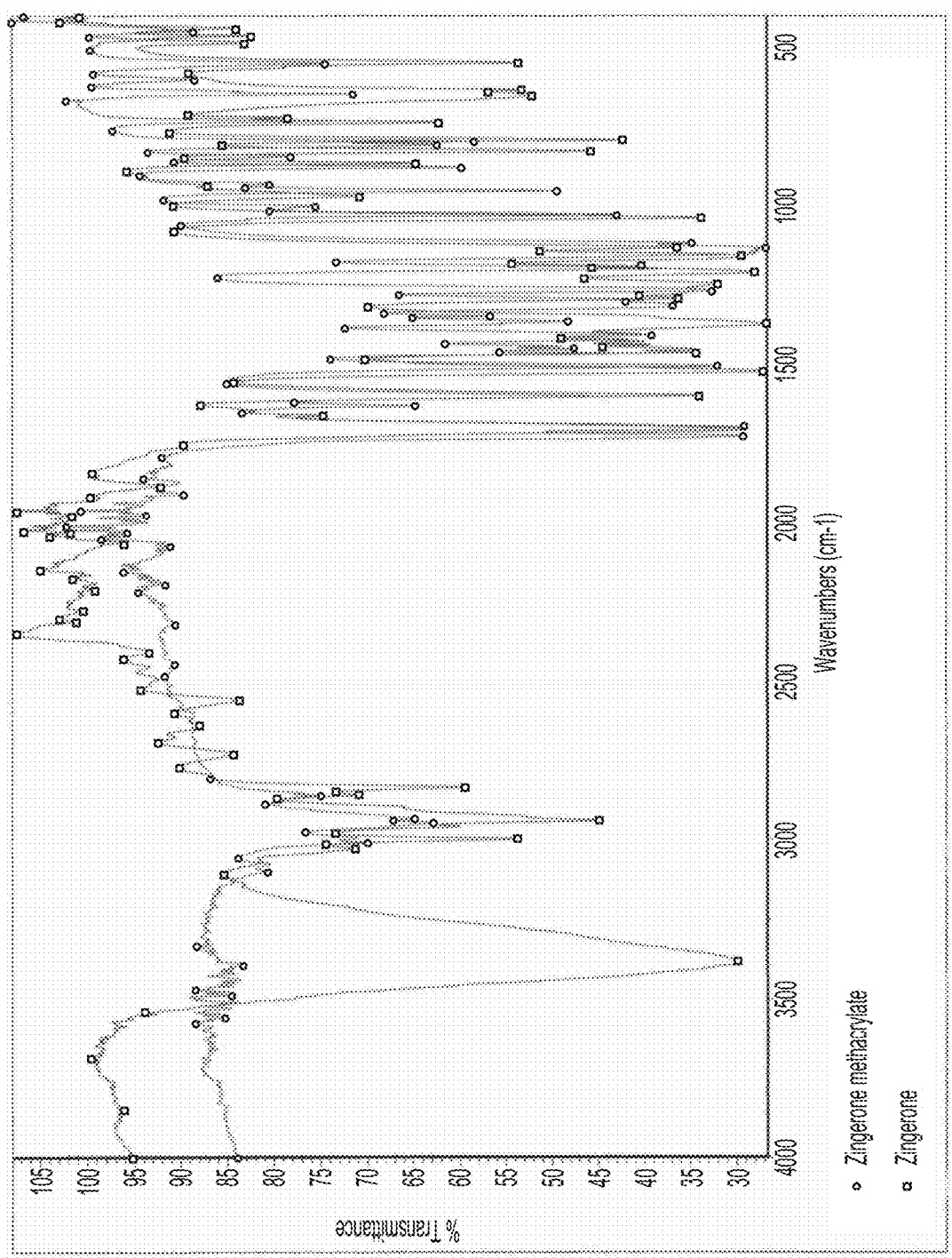
FIG. 17 shows the FTIR spectra of both FIGS. 15 and 16.

FIG. 15 is a FTIR spectrum of zingerone showing the various moieties at their respective frequencies. Of notes are the dip at 3379 cm$^{-1}$, which represents the phenol-hydroxy segment, and the ketone segment at 1708 cm$^{-1}$. FIG. 16 is a FTIR spectrum of the inventive zingerone methacrylate and FIG. 17 is a superposition of both spectra from FIGS. 15 and 16 with the spectrum for zingerone methacrylate substantially on top of the spectrum for zingerone. Figure xx shows the disappearance of the phenol-hydroxy moiety in the zingerone methacrylate monomer, which confirms that the hydroxy reaction site was used in the reaction. The ester ketone spike was shifted slightly to 1704 cm$^{-1}$ and the occurrence of the methacrylate carbonyl at 1729 cm$^{-1}$ and C=C vinyl at 1636 cm$^{-1}$ are indicative of the synthesis of a new composition. FTIR data (in cm-'): 3200-2850 (broad, multiple peaks), 1729, 1704, 1636 (weak), 1605, 1510, 1470, 1448, 1427, 1410, 1368, 1352, 1315, 1271, 1202, 1334, 1119, 1029, 1003 (weak), 954, 879, 804, 797, 733, 647, 548).

Example 5. Homo-Polymerization of Zingerone Methacrylate

The homo-polymer of zingerone methacrylate was prepared in a similar manner as the homo-polymer of frambinone methacrylate from Example 2.

Figure 18:
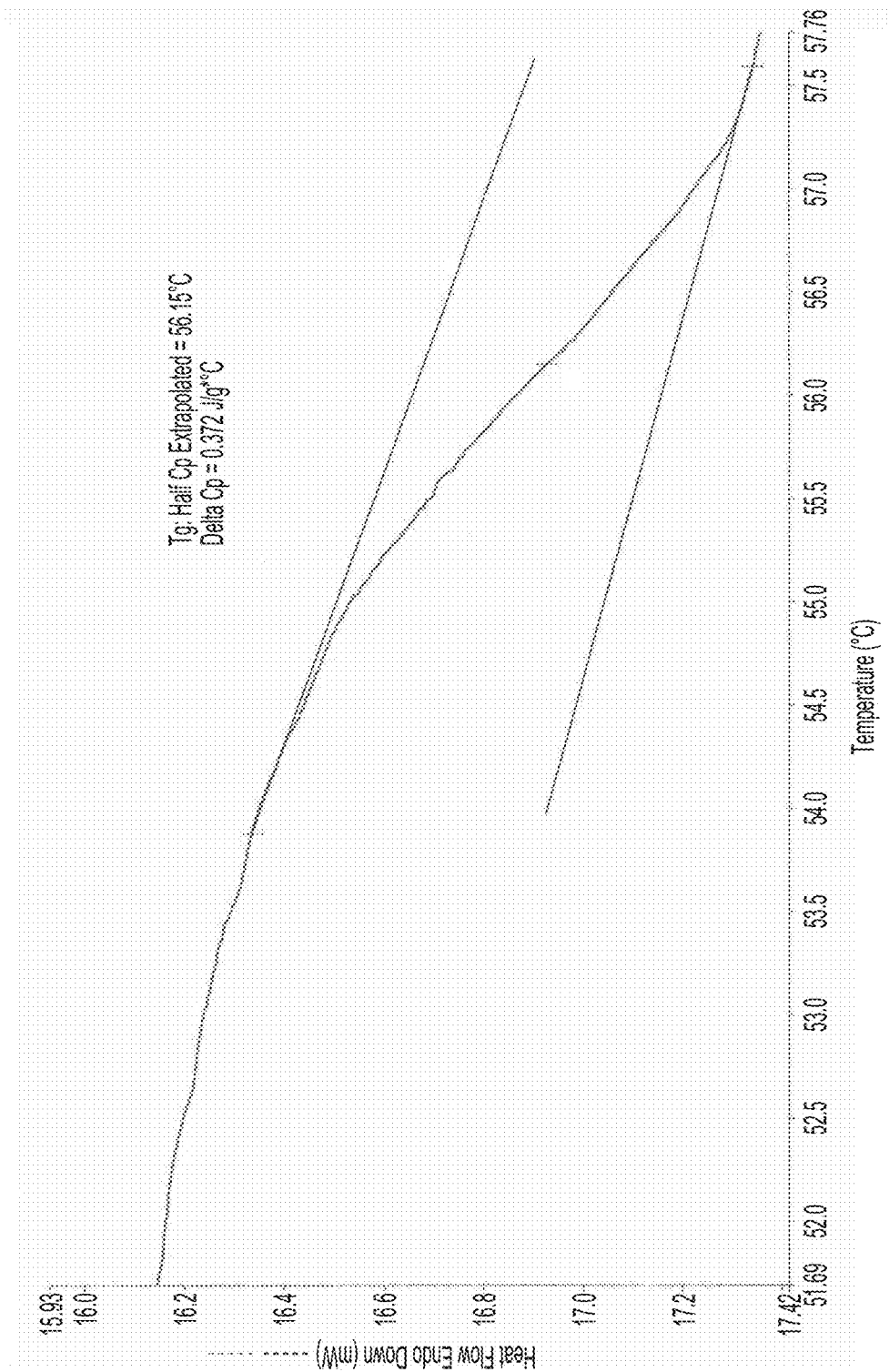
FIG. 18 is DSC plots of the ZMA monomer showing its glass transition temperature (Tg).

The Tg of the zingerone methacrylate homopolymer was measured using the experimental differential scanning calorimetry (DSC) technique, and found to be about 56° C., as shown in FIG. 18.

Example 6. Copolymerization Including Zingerone Methacrylate

Zingerone methacrylate was copolymerized with methyl methacrylate (MMA), butyl acrylate (BA) and methacrylic acid (MAA) utilizing the emulsion polymerization technique. Zingerone methacrylate was utilized without further purification, except for the removal of dichloromethane ($CH_2Cl_2$) solvent. Into a 1-liter, four-neck round bottom flask equipped with a thermocouple, feed tube, nitrogen inlet and a reflux condenser, water, surfactant, and a sodium bicarbonate buffer were charged. An aqueous emulsion of MMA, BA, MAA (1 wt. % based on total monomer solids or BOTMS), a wet adhesion monomer (1 wt. % BOTMS) and zingerone methacrylate (5 wt. % BOTMS) was prepared. About 5 wt. % of the monomer emulsion was fed into the round bottom flask and the polymerization was started by an addition of a sodium persulfate initiator at about 80° C. After 15 minutes of stirring, more monomer emulsion was fed to the mixture and after 30 minutes the feed rate was increased. After 3 hours, all of the monomer emulsion was added to the mixture. The mixture was held at about 80° C. for 30 minutes, then cooled to about 60° C. The mixture was chased by adding in a dropwise fashion over 15 minutes with an oxidizer solution of tertiary butyl hydroperoxide (tBHP) and a reducer solution of sodium salt of an organic sulfinic acid derivative. The mixture was then cooled to about 35° C. and neutralized with a 3.5 wt. % solution sodium hydroxide (NaOH). The mixture was further cooled, and biocide was added.

Figure 19:
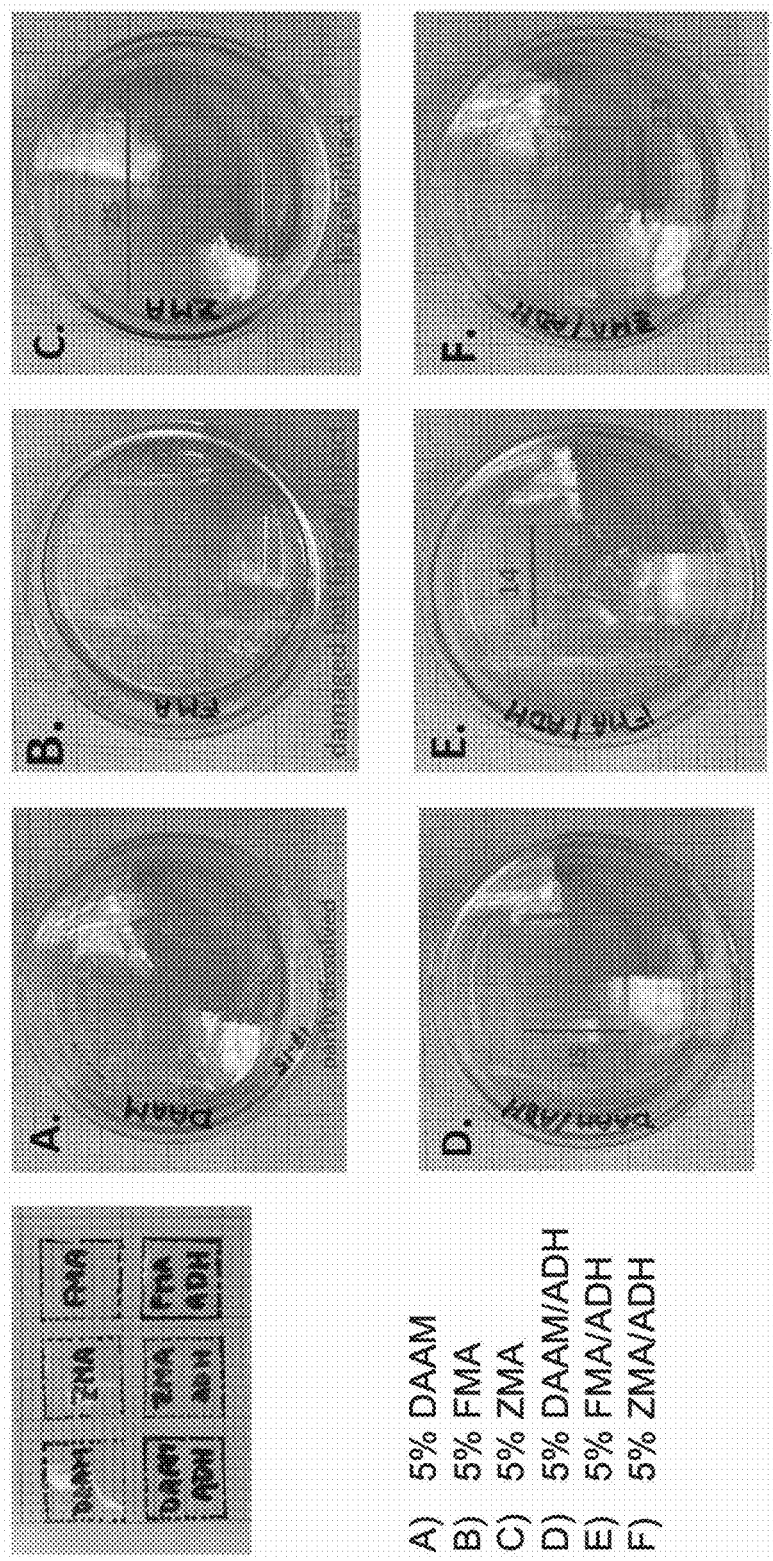
FIG. 19 (A)-(F) are photographs of dried films samples of a copolymer containing DAAM, FMA, ZMA each with and without ADH, after a swell ratio test.

The inventive copolymer has the following properties:
pH=8.4%
solid=49.5%
Particle size=140 nm (volume average),
MFFT=3° C. per ISO 2115 (April 2001) for measuring minimum film forming temperature, and
Brookfield viscosity=90 cP The Swell-Ratio Test. The inventive copolymer with zingerone methacrylate from Example 6 was tested and compared to a similar copolymer with frambinone methacrylate similar to that of Example 3 and a comparative, similar copolymer with the reactive diacetone acrylamide (DAAM) monomer. These three polymer samples were tested with and without ADH. Samples were prepared in the same manner as described above. FIGS. 19(A)-(F) are photographs of dry film samples of 8×8 units developed in MEK/toluene solvent for 2 hours and swelled. FIGS. 19(A) and (D) are samples with 5 wt. % of DAAM. The sample without ADH was partially dissolved and the sample with ADH swelled to 15×15 units$^2$ (3.5× swelling). FIGS. 19(B) and (E) are samples with 5 wt. % FMA. The sample without ADH was partially damaged but remained intact and the sample with ADH swelled to 14×14 units$^2$ (3.1× swelling). FIGS. 19(C) and (F) are samples with 5 wt. % ZMA. The sample without ADH remained intact and swelled to 25×25 units$^2$ (9.8× swelling), and the sample with ADH swelled to 13×13 units$^2$ (2.6× swelling). As stated above, the amount of cross-linking can be ascertained from the swell ratio by applying ASTM D2765 or ASTM F2214.

Paints with acrylic co-polymer resins with FMA, without FMA and with a conventional cross-linkable monomer DAAM were made and compared to each other, as shown in the following experiments.

Inventive Example 7: Acrylic Latex Co-Polymer Made with Frambinone Methacrylate Monomers The components for forming an acrylic latex polymer with self-crosslinkable FMA are provided in Table 1. To produce the binder, the reactor seeding was added into a nitrogen purged 4-neck reactor followed by a temperature increase to 75-80° C. Next, 50 g of the premixed monomer emulsion was added to the reactor followed by initiator solution I. The mixture was then allowed to react for 15 minutes. The remaining monomer emulsion and initiator solution II were then simultaneously added to the reactor over a period of 3.5 hours. The latex formed in the reactor was kept at 80° C. for 1 hour. The reactor was cooled to 60° C. followed by the simultaneous addition of the oxidizing agent and reducing agent solutions over a period of 30 minutes. The reactor was cooled to room temperature (e.g., 25° C.) and the biocide solution was added to arrive at a latex binder with a Flory-Fox glass transition temperature of 16° C. and a solid content of 51.2%. The latex is free of grits and has a particle size of 128 nanometers (volume average).

TABLE 1

| Component | Amount (g) |
|---|---|
| Reactor Seeding | |
| Water | 409 |
| Alpha-olefin surfonate (40%) | 1.5 |
| Sodium bicarbonate | 1 |
| Monomer Emulsion | |
| Water | 376 |
| Alpha-olefin surfonate (40%) | 13.5 |
| Phosphate ester surfactant (25%) | 39 |
| Ureido methacrylate (50%) | 21.2 |
| Methacrylic acid | 11 |
| Methyl methacrylate | 482 |
| Butyl acrylate | 424.4 |
| Frambinone methacrylate | 5.6 |
| Ammonium hydroxide (26%) | 1.5 |
| Initiator Solution I | |
| Water | 10.4 |
| Sodium persulfate | 1.82 |
| Initiator Solution II | |
| Water | 16.1 |
| Sodium persulfate | 0.73 |
| Oxidizing Agent Solution | |
| Tert-butylperoxide (70%) | 1.55 |
| Water | 17.5 |
| Reducing Agent Solution | |
| BRUGGOLITE FF6 M | 1.55 |
| water | 17.5 |
| Biocide Solution | |
| ACTICIDE CBM 2 | 3.8 |
| Water | 8.1 |
| Total | 1859.4 |

Comparative Example 8: Acrylic Latex Co-Polymer Made without Self-Crosslinking Monomer This comparative polymer example was made with the same components and process as inventive example 7, except that FMA was omitted from the monomer emulsion. The latex polymer has a similar Flory-Fox glass transition temperature of 16° C. and a solids content of 51.1%. The latex is free of grits and has a particle size of 116 nanometers (volume average).

Comparative Example 9: Acrylic Latex Polymer Made with Diacetone Acrylamide (DAAM) Monomer This comparative polymer example was made with the same components and process as in inventive example 7, except that 5.6 grams (equivalent to 0.024 moles) of FMA was replaced by 4 grams (equivalent to 0.024 moles) of DAAM in the monomer emulsion. By having same moles for both crosslinking monomers, the number of crosslinking functional groups, e.g., the ketone groups, will remain same in both latex polymers.

The comparative polymer example 9 has a similar Flory-Fox glass transition temperature of 16° C. and a solids content of 51.2%. The latex is free of grits and has a particle size of 133 nanometers (volume average).

Using the binder of latex polymers from Examples 7, 8, and 9, paint compositions were produced. The components for the paint compositions are provided in Table 2. While agitated at high speeds, the grind components were mixed for 10 minutes after all grind components were added. The agitation was slowed to mixing speed and the phase 1 letdown components were added and mixed for 20 minutes. The phase 2 letdown components were then added followed by additional mixing.

TABLE 2

| Component (grams) | Example 7 | Example 8 | Example 9 |
|---|---|---|---|
| Grind: | | | |
| water | 42.4 (g) | 42.4 (g) | 42.4 (g) |
| NUOSEPT 498 preservative | 0.5 | 0.5 | 0.5 |
| ACTICIDE RS | 1.2 | 1.2 | 1.2 |
| ZINC OMADINE ZOE DISPERSION MILDEWCIDE | 1.2 | 1.2 | 1.2 |
| Acrylic copolymer dispersant (22%) | 5.0 | 5.0 | 5.0 |
| Non-ionic surfactant | 1.5 | 1.5 | 1.5 |
| Defoamer 1 | 0.5 | 0.5 | 0.5 |
| TIONA 826 (Titanium Dioxide) | 132 | 132 | 132 |
| Kaolin extender pigment 1 | 10 | 10 | 10 |
| Kaolin extender pigment 2 (calcined) | 6 | 6 | 6 |
| Letdown: Phase 1 | | | |
| AEPD VOX 1000 amino alcohol | 6 | 6 | 6 |
| Phosphate ester surfactant (25%) | 3 | 3 | 3 |
| Ropaque OP-96 (opaque polymer) | 7.5 | 7.5 | 7.5 |
| Rheology Modifier (HUER type for Stormer viscosity) | 8.5 | 8.5 | 8.5 |
| Low VOC coalescence aid | 1.5 | 1.5 | 1.5 |
| Eastman Texanol ester alcohol | 4 | 4 | 4 |
| glycol ether DPM | 3.5 | 3.5 | 3.5 |
| Adipic acid dihydrazide acetone capped (40%) | 15 | 0 | 15 |
| Phase 2 | | | |
| Inventive latex polymer Example 7 (with FMA) | 220 | | |
| Comparative latex polymer Example 8 (without crosslinking monomer) | | 220 | |
| Comparative latex polymer Example 9 (with DAAM) | | | 220 |
| Defoamer 2 | 3 | 3 | 3 |
| Rheology Modifier (Polyether type for ICI viscosity) | 9.0 | 9.0 | 9.0 |
| Rheology Modifier (HUER type for Stormer viscosity) | 3.0 | 3.0 | 3.0 |
| Acrylic copolymer additive | 20 | 20 | 20 |
| Water | 40 | 40 | 40 |

Results and Discussion of Example 7-9

Paints were tested for stain cleansability, block resistance, tackiness, and scrubability.

| Paints | Cleanability (7 day dry) Delta E | | | | | Tackiness (CT3) | | Block resistance | | Scrubs |
|---|---|---|---|---|---|---|---|---|---|---|
| | Graphite | Ketchup | Mustard | Wine | Coffee | 1 day dry | 7 day dry | 1 day dry | 7 day dry | (7 day dry) |
| Example 7 | 2.68 | 0.23 | 0.38 | 3 | 1.82 | 1 | 3 | 2 | 2 | 1039 |
| Example 8 | 0.08 | 0.09 | 0.29 | 1.25 | 1.25 | 60 | 69 | 1(20%) | 1(10%) | 829 |
| Example 9 | 4.42 | 0.12 | 0.14 | 3.99 | 1.75 | 20 | 2 | 2 | 3 | 1689 |

Inventive paint Example 7 has improved tack and block resistance, and scrubability over comparative example 8, which does not have a crosslinking monomer. The present inventors believe that these improved properties were the effects of crosslinking of acrylic monomers with FMA in inventive paint Example 7.

Inventive paint Example 7 also has improved tack and block resistance, and equal or better stain cleanability, particularly for wine and graphite to comparative example 9, which has DAAM.

Inventive paint Example 7 has better scrubability than comparative example 8, which has no crosslinking monomer in the resin. Comparative example 9 has higher scrubability than the inventive paint example 7.

Preferably, based on the swell-ration tests of Example 6 and Example 7 FMA or ZMA or bio-based monomers with a ketone reactive site is present in the resin copolymer from about 0.25 wt. % to about 10 wt. %, preferably from about 0.40 wt. % to about 8 wt. %, and more preferably about 0.5 wt. % to about 6 wt. %.

Cleansability test is conducted on a 7-mil (wet) draw down on a Leneta dull plastic Scrub panel (P-121-10N) in a constant temperature and humidity room at 73° F. and 50% relative humidity. The draw down was allowed to dry for 7 days.

Household stains, graphite, tomato ketchup, yellow mustard, red cooking wine, and coffee, were applied on the surface of the draw down scrub panel. After 10 minutes, the panel was rinsed with tap water and dried by gentle wiping with a cellulose sponge. The scrub panel was mounted on a TQC AB5000 Washability machine, and washed with a sponge soaked with soap/water solution for 500 cycles. After washing, the panel was rinsed with water and dried for 24 hours. A spectrophotometer was used to measure the color difference, Delta E (DE), between stained and washed areas against unstained and washed area. A smaller DE indicates better cleansability of stains on paints The tackiness of paint films was tested with a Brookfield CT3 Texture Analyzer on a 3 mil (wet) draw down on BYK Byko-charts Plaint white sealed chart #2837. The draw-downs were allowed to dry for 1 or 7 days at a constant temperature and humidity room at 77° F. and 50% relative humidity. The adhesive force in grams is recorded in number. For each sample, three readings are recorded for each sample. An average of three readings is reported as the tackiness number. A lower tackiness number indicates the less tacky for the paint, and better performance in tack resistance Block resistance test was conducted using a Modified ASTM D4946. A paint drawdown was prepared on a sealed white Leneta WK card on a vacuum plate. The draw down was dried for 1 and 7 days at a constant temperature and humidity room at 25° C. and 50% humidity. One-inch squares were cut out of the panel and two squares were placed face to face. A 100-gram cubic weight was placed on top and was put in 120° F. for 24 hours. The sample was removed from oven & let panels cool for ½ hour. Fusion of samples was checked by pulling both panels apart in a slow & steady force. Ratings of blocking resistance is given by 5-no tack; 4-slight tack; 3—moderate tack; 2—poor tack; 1—transfer (note the % of film removed).

Scrub resistance test was done using ASTM D2486 Method B. The test was done on a 7-mil drawdown of paint dried for 7 days. A TQC Scrub Abrasion and Washability Tester with a boat weighing 340 grams was used for the test. The scrub cycle number at failure was recorded (where the paint film was removed and the surface of the underlying substrate shows through). A higher number from the reading indicates better scrub resistance of the paint.

The results show that when compared to the conventional DAAM/ADH cross-linkable mechanism, both FMA/ADH and ZMA/ADH show a high film integrity through cross-linking.

Alternative Embodiments

The present invention is not limited to the embodiments described above. Other starting materials can replace either the ketone compound, or methacrylic anhydride, or both.

Methacrylic anhydride belongs to the group of acid anhydrides. An acid anhydride is a compound that has two acyl groups bonded to the same oxygen atom. An acid anhydride has the following general structure,

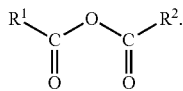

Other suitable acid anhydrides are vinylic structures which contain unsaturated alkene chemistry, and which include but are not limited to acrylic anhydride, maleic anhydride and other unsaturated acid anhydrides.

Another suitable compound that may be substituted for methacrylic anhydride is glycidyl methacrylate, having the following structure,

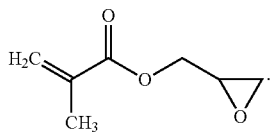

Synthesis by etherification involving glycidyl methacrylate is discussed in Al-Odayni, A.-B. et al., New Monomer Based on Eugenol Methacrylate, Synthesis, Polymerization and Copolymerization with Methyl Methacrylate—Characterization and Thermal Properties, *Polymers* 2020, 12, 160, 1-20; doi:10.3390/polym12010160, which is incorporated herein in its entirety.

Other phenolic compounds with a ketone reaction site and a hydroxy reaction site can be used in place of raspberry ketone or zingerone. Piceol is another suitable compound, which can be found in the needles and in mycorrhizal roots of Norway spruces. Piceol methacrylate can also be synthesized using the same technique.

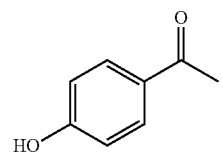

4-hydroxyphenylacetone is another suitable phenolic compound with a ketone reaction site and a hydroxy reaction site.

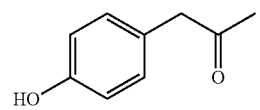

Other suitable bio-based phenolic compounds that can be synthesized into monomers and polymers are discussed in Lochab, B. et al., Naturally occurring phenolic sources: monomers and polymers, *RSC Adv.* 2014, 4, 21712-21752, which is incorporated by reference in its entirety.

Alternative Synthesizing Techniques

Generally, (meth)acrylic monomers, including FMA and ZMA, can be made either directly from (meth)acrylic acid in an esterification reaction, or from an activated form of (meth)acrylic acid, which can be an anhydride, acyl chloride, N-hydroxysuccinimide ester, etc. FMA and ZMA can be synthesized by other means, i.e., other than the technique discussed in Example 1.

FMA and ZMA can be synthesized by a Fisher, or Fisher-Speier esterification, between (meth)acrylic acid (or short alkyl chain ester thereof, such as the methyl- or ethyl ester), and raspberry ketone in the presence of a strong Lewis or Brønstedt acid catalyst. The reaction is performed preferably neat, but can also be performed in the presence of a solvent, which aids in the azeotropic removal of water (or methanol/ethanol), which is formed over the course of the reaction. Examples of Fisher type esterifications of phenol can be found in Bata, P. C. Rozdon, O. N., Acetylation of phenols using acetic acid, *Proc. Indian Acad. Sci.* (*Math. Sci.*) 1949, 29, 349-351; Offenhauer, R. D., The direct esterification of phenols, *J. Chem. Ed.* 1964, 41(1), 39; Konwar, D. et. al., Esterification of carboxylic acids by acid activated Kaolinite clay, *Ind. J. Chem. Techn.* 2008, 15, 75-78. These references are incorporated herein by reference in their entireties.

Alternatively, the methacrylic acid (or short alkyl chain ester thereof, such as the methyl- or ethyl ester) can be reacted in the presence of a lipase B enzyme, such as Novozym 435, as a catalyst. This reaction is preferably heated and can be performed neat/undiluted or in an organic solvent. Preferably, the organic solvent aids in the azeotropic removal of water (or methanol/ethanol) formed during the reaction. Examples of Lipase catalyzed synthesis are described in V. Athawale et al., Lipase-Catalyzed Synthesis of Geranyl Methacrylate by Transesterification: Study of Reaction Parameters *Tetrahedron Letters* 2020, 43(27), 4797-4800, and Roby, M. H. et al., Enzymatic Production of Bioactive Docohexaenoic Acid Phenolic Ester, *Food Chemistry* 2015, 171, 397-404. These references are incorporated herein by reference in their entireties.

Alternatively, FMA and ZMA can be made from an activated form of acid. For example, it can be made from a reaction between (meth)acrylic anhydride and raspberry ketone or zingerone in a variety of ways, as described by Anbu, N. et. al. in Acetylation of alcohols, amines, phenols, thiols under catalyst and solvent-free conditions, *Chemistry* 2019, 1, 69-79; Jin, T.-S. et al., Rapid and efficient method for acetylation of alcohols and phenols with acetic anhydride catalyzed by silica sulfate, *Synthetic Communications* 2006, 36, 1221-1227; Haddadin, M. J. et al., Acylation of phenol by cyclic and acyclic anhydrides in anhydrous acetic acid, *J. Pharm. Sci.* 1975, 64(11), 1766-1770; Yue, C. et. al., Acetylation of alcohols and phenols with acetic anhydride under solvent-free conditions using an ionic liquid based on morpholine as a recoverable and reusable catalyst, *Monatshefte für Chemie—Chemical Monthly* 2010, 141, 975-978; Meshram, G. A. and Patil, V. D., Simple and efficient method for acetylation of alcohols, phenols, amines, and thiols using anhydrous NiCl$_2$ under solvent-free conditions, *Synth. Commun.* 2009, 39(14), 2516-2528. These references are incorporated herein by reference in their entireties.

FMA and ZMA can also be synthesized by the methods described in US 2018/0201703 or US 2014/0275435 to synthesize methacrylated vanillin and/or methacrylated vanillyl alcohol. Other syntheses are disclosed in Al-Odayni, A.-B. et al., New Monomer Based on Eugenol Methacrylate, Synthesis, Polymerization and Copolymerization with Methyl Methacrylate—Characterization and Thermal Properties, *Polymers* 2020, 12, 160, 1-20; Tale, N. V., Jagtap, R. N., Synthesis of Diacetone Acrylamide Monomer and the Film Properties of Its Copolymers, Iranian Polym. J. 2010, 19(10), 801-810; Rupavani, J. et al., Synthesis, Characterization and End Use Evaluation of 2-Allyl-3(5)-pentadecyl Phenol and Their Acrylic/Methacrylic Esters, *Eur. Polym. J.* 1993, 29(6), 863-869. All of these references are incorporated herein by reference in their entireties.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A paint composition comprising an aqueous phase and a copolymer polymerized from a monomer with a following structure

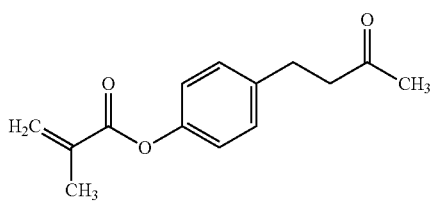

and at least one other monomer, wherein said copolymer is dispersed in the aqueous phase,
wherein the copolymer is capable of forming a film on a substrate after the paint composition is applied on said substrate and the aqueous phase evaporates.

2. The paint composition of claim 1, wherein a moiety formed by the copolymer is capable of cross-linking with a hydrazide in the aqueous phase.

3. The paint composition of claim 1, wherein said at least one other monomer comprises an acrylic, a vinyl, a styrene, or a urethane monomer.

4. The paint composition of claim 2, wherein said at least one other monomer comprises an acrylic, a vinyl, a styrene, or a urethane monomer.

5. A paint composition comprising an aqueous phase and a copolymer polymerized from a monomer with a following structure

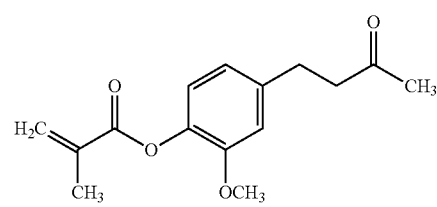

and at least one other monomer, wherein said copolymer is dispersed in the aqueous phase,
wherein the copolymer is capable of forming a film on a substrate after the paint composition is applied on said substrate and the aqueous phase evaporates.

6. The paint composition of claim 5, wherein a moiety formed by the copolymer is capable of cross-linking with a hydrazide in the aqueous phase.

7. The paint composition of claim 5, wherein said at least one other monomer comprises an acrylic, a vinyl, a styrene, or a urethane monomer.

8. The paint composition of claim 6, wherein said at least one other monomer comprises an acrylic, a vinyl, a styrene, or a urethane monomer.

9. A copolymer polymerized from the monomer with a following structure

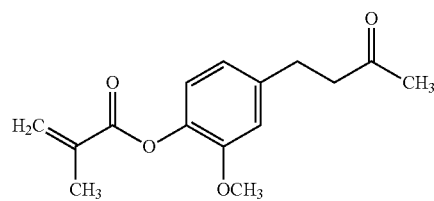 [SMILES: C=C(C)C(=O)Oc1ccc(CCC(C)=O)cc1OC]

and at least one other monomer, wherein said copolymer is dispersible in an aqueous phase.

10. The copolymer of claim 9, wherein a moiety formed by the copolymer is capable of cross-linking with a hydrazide in the aqueous phase.

11. The copolymer of claim 9, wherein said at least one monomer comprises an acrylic, a vinyl, a styrene, or a urethane monomer.

12. The copolymer of claim 10, wherein said at least one monomer comprises an acrylic, a vinyl, a styrene, or a urethane monomer.

13. The paint composition of claim 3, wherein the copolymer comprises frambinone methacrylate.

14. The paint composition of claim 7, wherein the copolymer comprises zingerone methacrylate.

15. The paint composition of claim 11, wherein the copolymer comprises zingerone methacrylate.

* * * * *